(12) United States Patent
Ito et al.

(10) Patent No.: US 9,517,945 B2
(45) Date of Patent: Dec. 13, 2016

(54) LOW-TEMPERATURE ROUTE FOR PRECISION SYNTHESIS OF METAL OXIDE NANOPARTICLES

(71) Applicant: University of Oregon, Eugene, OR (US)

(72) Inventors: Daisuke Ito, Kanagawa (JP); James E. Hutchison, Eugene, OR (US)

(73) Assignee: University of Oregon, Eugene, OR (US)

( * ) Notice: Subject to any disclaimer, the term of this patent is extended or adjusted under 35 U.S.C. 154(b) by 231 days.

(21) Appl. No.: 14/092,800

(22) Filed: Nov. 27, 2013

(65) Prior Publication Data
US 2015/0259217 A1   Sep. 17, 2015

Related U.S. Application Data

(60) Provisional application No. 61/730,912, filed on Nov. 28, 2012.

(51) Int. Cl.
*C01G 51/04* (2006.01)
*C01G 15/00* (2006.01)
(Continued)

(52) U.S. Cl.
CPC ............ *C01G 51/04* (2013.01); *C01B 13/14* (2013.01); *C01G 1/02* (2013.01); *C01G 9/02* (2013.01); *C01G 15/00* (2013.01); *C01G 19/00* (2013.01); *C01G 45/02* (2013.01); *C01G 49/06* (2013.01); *C01P 2002/72* (2013.01); *C01P 2002/84* (2013.01); *C01P 2002/85* (2013.01);
(Continued)

(58) Field of Classification Search
CPC .......... C01G 51/00; C01G 51/04; C01G 9/02; C01G 45/02; C01G 49/02; Y10T 428/2991
See application file for complete search history.

(56) References Cited

U.S. PATENT DOCUMENTS

| | | |
|---|---|---|
| 7,811,545 B2 | 10/2010 | Hyeon et al. |
| 2012/0001357 A1* | 1/2012 | Xiao .................. B22F 1/0048 264/12 |

OTHER PUBLICATIONS

Li, Guozhu, et al. "Synthesis of nearly monodisperse nanoparticles in alcohol: A pressure and solvent-induced low-temperature strategy." Applied Surface Science 255.15 (2009): 7021-7027.*

(Continued)

*Primary Examiner* — Richard M Rump
(74) *Attorney, Agent, or Firm* — Klarquist Sparkman, LLP

(57) ABSTRACT

Methods for making metal oxide nanoparticles, including mixed metal oxides and core-shell metal oxide nanoparticles, are disclosed. A solution comprising a metal carboxylate and a carboxylic acid is combined with a solvent comprising an alcohol heated to a temperature $\leq 250°$ C. for an effective period of time to form metal oxide nanoparticles. The metal may be a group IIIA metal, a group IVA metal, a transition metal, or a combination thereof. A metal oxide shell may be deposited onto metal oxide nanoparticles by dispersing the metal oxide nanoparticles in an alcohol, adding a metal carboxylate, and maintaining the reaction at a temperature $\leq 200°$ C. for an effective period of time to form core-shell nanoparticles. The nanoparticles may have a relative size dispersity of $\leq 20\%$, and may further comprise a plurality of carboxylic acid, carboxylate, and/or alcohol ligands coordinated to the nanoparticles' outer surfaces.

21 Claims, 21 Drawing Sheets
(18 of 21 Drawing Sheet(s) Filed in Color)

(51) Int. Cl.
| | |
|---|---|
| C01G 45/02 | (2006.01) |
| C01G 9/02 | (2006.01) |
| C01G 19/00 | (2006.01) |
| C01G 49/06 | (2006.01) |
| C01B 13/14 | (2006.01) |
| C01G 1/02 | (2006.01) |

(52) U.S. Cl.
CPC ...... C01P 2004/04 (2013.01); C01P 2004/51 (2013.01); C01P 2004/52 (2013.01); C01P 2004/64 (2013.01); C01P 2004/84 (2013.01); Y10T 428/2991 (2015.01)

(56) References Cited

OTHER PUBLICATIONS

Caruntu, Daniela, et al. "One-step synthesis of nearly monodisperse, variable-shaped In2O3 nanocrystals in long chain alcohol solutions." The Journal of Physical Chemistry C 114.11 (2010): 4875-4886.*

Ito, Daisuke, et al. "Convenient preparation of ITO nanoparticles inks for transparent conductive thin films." Journal of Nanoparticle Research 14.12 (2012): 1-7.*

Kovalenko, Maksym V., et al. "Fatty acid salts as stabilizers in size-and shape-controlled nanocrystal synthesis: the case of inverse spinel iron oxide." Journal of the American Chemical Society 129.20 (2007): 6352-6353.*

Agoston et al., "Thermodynamic Stability, Stoichiometry, and Electronic Structure of bcc-$In_2O_3$ Surfaces," Physical Review B, 84, 045311-1 to 045311-20, 2011.

Ba et al., "Nonaqueous Synthesis of Uniform Indium Tin Oxide nanocrystals and Their Electrical Conductivity in Dependence of the Tin Oxide Concentration," Chemistry of Materials, 18, 2848-2854, 2006.

Binet et al., "Origin of the Blue Luminescence of β $Ga_2O_3$," Journal of Physical Chemistry Solids, vol. 59, No. 8, pp. 1241-1249, 1998.

Caruntu et al., "One-Step Synthesis of Nearly Monodisperse, Variable-Shaped $In_2O_3$ Nanocrystals in Long Chain Alcohol Solutions," Journal of Physical Chemistry C, 114, 4875-4886, 2010.

Chang et al., "Formation of Well-Aligned $ZnGa_2O_4$ Nanowires from $Ga_2O_3$/ZnO Core-Shell Nanowires via a $Ga_2O_3$/$ZnGa_2O_4$ Epitaxial Relationship," Journal of Physical Chemistry B, 109, 13572-13577, 2005.

Gilstrap Jr. et al., "Synthesis of a Nonagglomerated Indium Tin Oxide Nanoparticle Dispersion," Advanced Materials, 20, 4163-4166, 2008.

Hong et al., "A Convenient Alcohothermal Approach for Low Temperature Synthesis of CuO Nanoparticles," Materials Letters 52, 34-38, 2002.

Hu et al., "Synthesis and Characterization of $In_2O_3$ Nanocube via a Solvothermal-Calcination Route," Materials Chemistry and Physics, 118, 277-280, 2009.

Ito et al., "Room Temperature Observation of Negative Differential Resistance Effect Using ZnO Nanocrystal Structure with Double Schottky Barriers," Applied Physics Letters, 90, 143118, 2007.

Jana et al., Size- and Shape-Controlled Magnetic (Cr, Mn, Fe, Co, Ni) Oxide nanocrystals via a Simple and General Approach, Chemistry of Materials, 16, 3931-3935, 2004.

Joo et al., "Large-Scale Synthesis of $TiO_2$ Nanorods via Nonhydrolytic Sol-Gel Ester Elimination Reaction and Their Application to Photocatalytic Inactivation of E. coli," Journal of Physical Chemistry B, 109, 15297-15302, 2005.

Joo et al., "Synthesis of ZnO Nanocrystals with Cone, Hexagonal Cone, and Rod Shapes via Non-Hydrolytic Ester Elimination Sol-Gel Reactions," Advanced Materials, 17, 1873-1877, 2005.

Kwon et al., "Colloidal Chemical Synthesis and Formation Kinetics of Uniformity Sized Nanocrystals of Metals, Oxides, and Chalcogenides," Accounts of Chemical Research, vol. 41, No. 12, 1696-1709, 2008.

Narayanaswamy et al., "Formation of Nearly Monodisperse $In_2O_3$ Nanodots and Oriented-Attached Nanoflowers: Hydrolysis and Alcoholysis vs Pyrolysis," Journal of American Chemical Society, 128, 10310-10319, 2006. (published online Jul. 19, 2006).

Niederberger et al., "Nonaqueous Synthesis of Metal Oxide Nanoparticles: Review and Indium Oxide as Case Study for the Dependence of Particle Morphology on Precursors and Solvents," Journal of Sol-Gel Science and Technology, 40:259-266, 2006.

Niederberger et al., "Organic Reaction Pathways in the Nonaqueous Synthesis of Metal Oxide Nanoparticles," Chemistry A European Journal, 12, 7282-7302, 2006.

Park et al., "Synthesis of Monodisperse Spherical Nanocrystals," Angewandte Chemie International Edition, 46, 4630-4660, 2007.

Pinna et al., "Magnetite nanocrystals: Nonaqueous Synthesis, Characterization, and Solubility," Chemistry of Materials, 17, 3044-3049, 2005.

Rothschild et al., "The Effect of Grain Size on the Sensitivity of Nanocrystalline Metal-Oxide Gas Sensors," Journal of Applied Physics, vol. 95, No. 11, 6374-6380, 2004.

Sawada et al., "TG-DTA-MS of Indium Acetate," Journal of the Mass Spectrometry Society of Japan, vol. 46, No. 4, 292-295, 1998.

Singhal et al., Chemical Synthesis and Structural and Magnetic Properties of Dispersible Cobalt- and Nickel-Doped ZnO Nanocrystals, Journal of Physical Chemistry C, 114, 3422-3430, 2010.

Steunou et al., "Synthesis Through an in situ Esterification Process and Characterization of Oxo Isopropoxo Titanium Clusters," Inorganica Chimica Acta 279, 144-151, 1998.

Tang et al., "Size-Controllable Growth of Single Crystal $in(OH)_3$ and $In_2O_3$ Nanocubes," Crystal Growth & Design, vol. 5, No. 1, 147-150, 2005. (published online Aug. 19, 2004).

Tao et al., "Shape Control of Colloidal Metal Nanocrystals," Small, 4, No. 3, 310-325, 2008.

Zhong et al., "Nonhydrolytic Alcoholysis Route to Morphology-Controlled ZnO Nonocrystals," Small, 3, No. 7, 1194-1199, 2007.

Caruntu et al., "One-Step Synthesis of Nearly Monodisperse, Variable-Shaped $In_2)_3$ Nanocrystals in Long Chain Alcohol Solutions," J. Phys. Chem. C, 114:4875-4886 (2010).

Ito et al. "Greener, Low-cost Route toward Self-assembled ITO Nanoparticle Coating," poster presented at the International Symposium on Clusters and Nanostructures, Nov. 7-10, 2011.

Singhal et al., "Chemical Synthesis and Structural and Magnetic Properties of Dispersible Cobalt- and Nickel-Doped ZnO Nanocrystals," J. Phys. Chem. C, 114:3422-3420 (2010).

* cited by examiner

| 2theta | Intensity |
|---|---|
| 21.504 | 14 |
| 30.575 | 100 |
| 35.475 | 30 |
| 37.677 | 8 |
| 45.703 | 10 |
| 51.043 | 35 |
| 60.68 | 25 |

| 2theta | Intensity |
|---|---|
| 15 | 2 |
| 18.4 | 5 |
| 23.83 | 5 |
| 30.26 | 34 |
| 32.16 | 19 |
| 35.59 | 100 |
| 38.8 | 6 |
| 43.47 | 24 |
| 53.88 | 12 |
| 57.17 | 33 |
| 62.74 | 53 |
| 71.4 | 7 |
| 74.67 | 11 |
| 75.38 | 3 |
| 79.47 | 5 |

| 2theta | Intensity |
|---|---|
| 31.761 | 57 |
| 34.413 | 44 |
| 36.245 | 100 |
| 47.534 | 23 |
| 56.602 | 32 |
| 62.865 | 29 |
| 66.384 | 4 |
| 67.962 | 23 |
| 69.109 | 11 |
| 72.574 | 2 |
| 76.968 | 4 |
| 81.358 | 1 |

LOW-TEMPERATURE ROUTE FOR PRECISION SYNTHESIS OF METAL OXIDE NANOPARTICLES

CROSS REFERENCE TO RELATED APPLICATION

This application claims the benefit of U.S. Provisional Application No. 61/730,912, filed Nov. 28, 2012, which is incorporated in its entirety herein by reference.

ACKNOWLEDGMENT OF GOVERNMENT SUPPORT

This invention was made with government support under FA8650-05-1-5041 awarded by the Air Force Research Laboratory. The government has certain rights in the invention.

FIELD

The disclosure pertains to low-temperature methods for making metal oxide nanoparticles, including mixed metal oxides and core-shell metal oxide nanoparticles, using metal carboxylates, a carboxylic acid and an alcohol.

PARTIES TO JOINT RESEARCH AGREEMENT

State of Oregon acting by and through the State Board of Higher Education on behalf of the University of Oregon and Sony Corporation.

BACKGROUND

Metal oxide nanoparticles are useful in a variety of technologically important applications. Nanoparticle deposition is expected to be a promising alternative to current thin-film deposition technologies for low-temperature fabrication of metal oxide films. Metal oxide nanoparticle-inks can be deposited using existing roll-to-roll or ink-jet systems to realize low-cost, low-waste, highly scalable and high-speed manufacturing. In the case of nanoparticle films, sintering at high temperature may not be required because the crystalline nanoparticles are formed during chemical production.

Although solution deposition of metal oxide nanoparticle-inks is a versatile and simple approach to depositing metal oxide films, the synthesis of metal oxide nanoparticles that are highly crystalline, monodisperse and precisely doped by a simple and reproducible general route remains a significant challenge. Metal oxide nanoparticles typically have been produced at high temperatures and under thermal decomposition conditions, and the synthesis parameters are difficult to control precisely. To achieve monodisperse nanocrystals, the reaction conditions are chosen to separate the nucleation and growth phases of the reaction. High temperatures are typically required to solubilize precursors, decompose the precursors, and/or convert (anneal) amorphous nanoparticles to the crystalline form. For example, monodispersed metal oxide nanoparticles have been synthesized by thermal decomposition or pyrolysis of metal organic precursors at temperatures greater than 300° C. (Park et al., *Ang. Chemie,* 46:4630-60 (2007); Jana et al., *Chemistry of Materials,* 16:3932-3935 (2004)). Extended reaction and aging times are often required to attain crystalline nanoparticles, and uniform doping or production of mixed oxide nanocrystals can be difficult because each metal precursor has a different decomposition temperature. The production of core/shell structures is challenging under these conditions because nucleation of new particles from the shell precursor competes with shell growth onto the core material. Finally, high temperatures preclude the use of thermally-sensitive organic chemical functionality within stabilizers and ligands.

Metal oxide nanoparticles also have been formed by alcoholysis and aminolysis of metal precursors (Park et al., *Ang. Chemie,* 46:4630-4660 (2007); Narayanaswamy et al., *JACS,* 128:10310-9 (2006); Gilstrap et al., *Adv. Mat.,* 20:4163-6 (2008)). However, these methods still use reaction temperatures above 290° C.

SUMMARY

Embodiments of crystalline metal oxide nanoparticles, including mixed metal oxides and core-shell metal oxide nanoparticles, and methods of making the nanoparticles are disclosed.

Disclosed embodiments of a method for making nanoparticles comprising a metal oxide include (a) providing a solution comprising RCOOH and a corresponding metal carboxylate comprising RCOO$^-$ and a metal cation M, wherein M is a group IIIA metal, a group IVA metal, a transition metal, or a combination thereof, and R is saturated or unsaturated C1-C21 aliphatic; (b) combining the solution with a solvent comprising R'OH to produce a mixture, wherein R' is saturated or unsaturated C2-C22 aliphatic, and wherein the solvent is preheated to a temperature, $T_1$, prior to combining the solution with the solvent, wherein $T_1$ is less than a thermal decomposition temperature of the corresponding metal carboxylate; and (c) maintaining the mixture at a temperature, $T_2$, for an effective period of time to form crystalline metal oxide nanoparticles wherein $T_2$ is less than a thermal decomposition temperature of the corresponding metal carboxylate. In some embodiments, $T_1$ and/or $T_2$ is ≤240° C. In some embodiments, the method further includes flowing a gas across a surface of the mixture, thereby evaporating and removing water produced as the crystalline metal oxide nanoparticles are formed, and/or isolating the crystalline metal oxide nanoparticles after the effective period of time.

In some embodiments, $T_1$ and/or $T_2$ is 160° C. to 230° C. The effective period of time may be ≤30 minutes. The solution may be combined with the solvent comprising R'OH by injecting the solution into the solvent, such as by injecting the solution into the solvent at a rate of up to 0.5 mL/minute, such as 0.1-0.5 mL/minute.

Providing a solution comprising the metal carboxylate and RCOOH may include providing a C1-C5 metal carboxylate comprising M, combining the C1-C5 metal carboxylate with a molar excess of RCOOH, and heating to convert at least a portion of the C1-C5 metal carboxylate to the metal carboxylate comprising RCOO$^-$ and M, thereby forming the solution comprising the metal carboxylate and RCOOH. In some embodiments, M is Mn, Fe, Co, Zn, Sn, In, or a combination thereof.

In some embodiments, [R'OH]>[RCOOH]>[M] when the solution is combined with the solvent. In one embodiment, [R'OH] is at least 10× greater than [M] when the solution is combined with the solvent. R'OH may be a liquid at temperatures less than 200° C. In certain embodiments, the metal carboxylate is soluble in R'OH at temperatures ≤240° C.

In some embodiments, R and R' are linear aliphatic and differ in length by five or fewer carbon atoms. In certain embodiments, R' is RCH$_2$—. In one embodiment, RCOOH is oleic acid and R'OH is oleyl alcohol.

In some embodiments, a metal oxide shell is deposited onto the crystalline metal oxide nanoparticles by (i) combining crystalline metal oxide nanoparticles comprising M with R'''OH to produce a mixture, where R''' is saturated or unsaturated C2-C22 aliphatic; (ii) heating the mixture to a temperature, T$_3$, of ≤200° C.; (iii) providing a solution comprising and R''COOH and a corresponding metal carboxylate comprising R''COO$^-$ and a metal cation M', where M' is a group IIIA metal, a group IVA metal, a transition metal, or a combination thereof, and R'' is saturated or unsaturated C1-C21 aliphatic; (iv) combining the solution with the mixture; and (v) maintaining the combined solution and mixture at a temperature, T$_4$, of ≤200° C. for an effective period of time to form core-shell nanoparticles comprising a crystalline metal oxide core including M and a metal oxide shell including M' deposited onto the metal oxide core. In some embodiments, the effective period of time is at least 5 minutes. M and M' may be the same or different metals. In certain embodiments, R'' is R, and R''' and R' are RCH$_2$—.

T$_3$ and/or T$_4$ may be 150-200° C. In certain embodiments, T$_4$ is less than a nucleation temperature for a metal oxide comprising M', and oxygen is excluded during deposition of the metal oxide shell.

Embodiments of the disclosed methods can be used to prepare a plurality of crystalline nanoparticles having a relative size dispersity of ≤20%, each nanoparticle including a metal oxide crystal and a plurality of RCOOH molecules and/or RCOO— ligands coordinated to an outer surface of the metal oxide crystal. The nanoparticle may further include R'OH molecules and/or R'O— ligands coordinated to the outer surface of the metal oxide crystal. The nanoparticles may have an average largest dimension of ≤20 nm. In some embodiments, the metal oxide comprises In$_2$O$_3$, Fe$_2$O$_3$, Mn$_3$O$_4$, CoO, ZnO, SnO$_2$, Ga$_2$O$_3$, or a combination thereof. In certain embodiments, R is cis-CH$_3$(CH$_2$)$_7$CH=CH(CH$_2$)$_7$—.

Some embodiments of the disclosed methods can be used to prepare core-shell nanoparticles with a relative size dispersity of ≤20%, where each nanoparticle includes a crystalline metal oxide core comprising M, a metal oxide shell comprising M', and plurality of RCOOH molecules and/or RCOO— ligands coordinated to an outer surface of the metal oxide shell. M and M' may be the same or different metals. In certain embodiments, the metal oxide cores have an average largest dimension of ≤20 nm, and the metal oxide shells have an average thickness of 1-10 nm.

A plurality of nanoparticles as disclosed herein may have a relative size dispersity of ≤20%, and each nanoparticle includes (1) a crystalline metal oxide core having a formula M$_x$O$_y$, wherein M is a group IIIA metal, a group IVA metal, a transition metal, or a combination thereof, and x and y are positive integers, and (2) a plurality of RCOOH molecules and/or RCOO— ligands coordinated to an outer surface of the nanoparticle, wherein R is saturated or unsaturated C5-C21 aliphatic. In one embodiment, R is cis-CH$_3$(CH$_2$)$_7$CH=CH(CH$_2$)$_7$—. In certain embodiments, the metal oxide comprises In$_2$O$_3$, Fe$_2$O$_3$, Mn$_3$O$_4$, CoO, ZnO, SnO$_2$, Ga$_2$O$_3$, or a combination thereof. The nanoparticles may further include a metal oxide shell between the crystalline metal oxide core and the plurality of RCOOH molecules and/or RCOO— ligands, the metal oxide shell having a formula M'$_x$O$_y$, wherein M' is a group IIIA metal, a group IVA metal, a transition metal, or a combination thereof. M and M' may be the same or different. In some embodiments, the metal oxide cores have an average largest dimension of ≤20 nm, and the metal oxide shells have an average thickness of 1-10 nm.

The foregoing and other objects, features, and advantages of the invention will become more apparent from the following detailed description, which proceeds with reference to the accompanying figures.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 5a is a low-magnification transmission electron microscopy (TEM) image of indium oxide nanocrystals synthesized by one embodiment of the disclosed methods.

FIG. 5b is a histogram of indium oxide nanocrystal diameters corresponding to the nanocrystals shown in FIG. 5a.

FIG. 5c is an X-ray photoelectron microscopy (XPS) spectrum of indium oxide nanocrystals such as those shown in FIG. 5a.

FIG. 5d is a high-resolution TEM image of indium oxide nanocrystals such as those shown in FIG. 5a.

FIG. 5e is an image based on a fast Fourier transform (FFT) of the image shown in FIG. 5d.

FIG. 5f is, a schematic drawing illustrating the structure of In$_2$O$_3$ nanocrystals synthesized at 230° C. according to one embodiment of the disclosed methods.

FIG. 14a is a low-magnification TEM image of 10% tin-doped indium tin oxide (ITO) nanocrystals synthesized according to one embodiment of the disclosed methods; the inset is a selected area electron diffraction (SAED) pattern.

FIG. 14b is a histogram of ITO nanocrystal diameters corresponding to the nanocrystals shown in FIG. 14a.

FIG. 14c is a high-resolution TEM image of ITO nanocrystals corresponding to the nanocrystals shown in FIG. 14a.

FIG. 14d is an image corresponding to a FFT of the TEM image of the ITO nanocrystals corresponding to FIG. 14c.

FIG. 14e shows UV-visible spectra of undoped indium oxide nanocrystals, and ITO nanocrystals comprising 5% and 10% tin.

FIG. 14f is a graph of optical absorption as a function of photon energy for undoped indium oxide nanocrystals and ITO nanocrystals comprising 5% and 10% tin.

DETAILED DESCRIPTION

Figure 1:
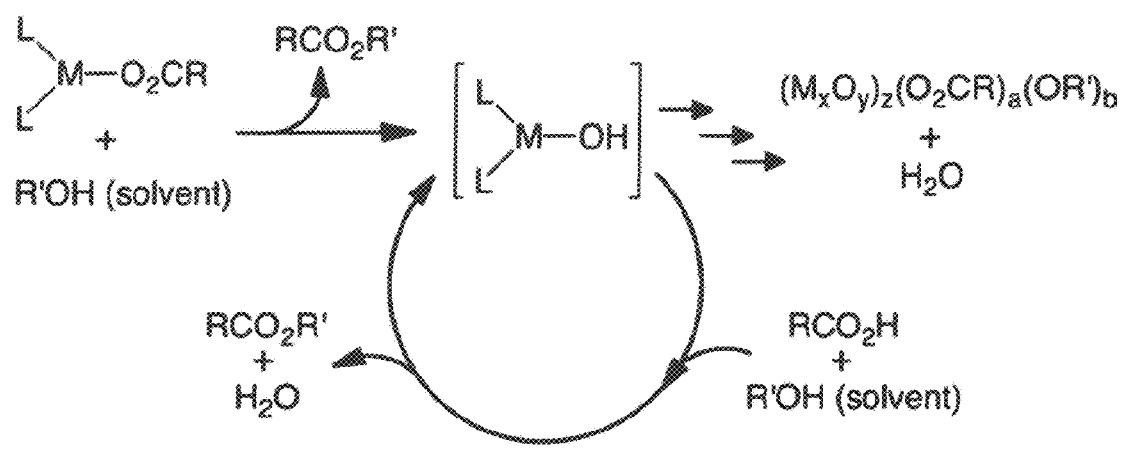
FIG. 1 is a scheme illustrating one embodiment of a reaction between a metal carboxylate and an alcohol, resulting in synthesis of a metal oxide.

Embodiments of a versatile, low-temperature method for synthesizing metal oxide, core/shell nanoparticles, and doped nanoparticles via an esterification reaction between a metal carboxylate and an alcohol are disclosed. The nanoparticles may be ligand-stabilized. Embodiments of the disclosed esterification process produce crystalline metal oxide nanoparticles with excellent control over the size, size dispersity, and doping level. Some embodiments of the disclosed method also can be used to produce core/shell nanocrystals by epitaxial growth of shells onto nanoparticle cores. Embodiments of the disclosed method can be performed at low temperatures (<230° C.) using alcohols and carboxylic acids derived from non-toxic natural oils. In some embodiments, the reaction by-product, an ester, is also a non-toxic natural oil. Embodiments of the metal oxide and core/shell nanoparticles are useful in a variety of technologically important applications, and the nanoparticle properties can be optimized or otherwise tailored by carefully choosing and incorporating specific matrix metal elements and metal ion dopants.

The lower temperature and enhanced control of the chemical reactivity facilitates synthesis of precisely doped nanocrystals and core/shell nanocrystals that enhance the functionalities of these nanocrystals. In the case of the doped nanocrystals, the esterification reaction addresses a significant challenge in the production of these types of nanocrystals from multiple precursors, that is to balance the reactivity of the two precursors. In the case of the core/shell structures, the ability to generate reactive precursors that can contribute to shell growth without resulting in nucleation of new nanocrystals is an advantage. Such lower temperature approaches may also aid in preserving kinetic structures formed in shape-controlled reactions that might be altered if reactions are conducted at higher temperatures.

I. Definitions

The following explanations of terms and abbreviations are provided to better describe the present disclosure and to guide those of ordinary skill in the art in the practice of the present disclosure. As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting. Other features of the disclosure are apparent from the following detailed description and the claims.

Unless otherwise indicated, all numbers expressing quantities of components, molecular weights, percentages, temperatures, times, and so forth, as used in the specification or claims are to be understood as being modified by the term "about." Accordingly, unless otherwise indicated, implicitly or explicitly, the numerical parameters set forth are approximations that may depend on the desired properties sought and/or limits of detection under standard test conditions/methods. When directly and explicitly distinguishing embodiments from discussed prior art, the embodiment numbers are not approximates unless the word "about" is recited.

Definitions of common terms in chemistry may be found in Richard J. Lewis, Sr. (ed.), *Hawley's Condensed Chemical Dictionary*, published by John Wiley & Sons, Inc., 1997

(ISBN 0-471-29205-2). In order to facilitate review of the various embodiments of the disclosure, the following explanations of specific terms are provided:

Alcohol: A chemical compound having the general formula ROH, where R denotes virtually any group, including aliphatic, substituted aliphatic, aryl, arylalkyl, heteroaryl, etc.

Aliphatic: A substantially hydrocarbon-based compound, or a radical thereof (e.g., $C_6H_{13}$, for a hexane radical), including alkanes, alkenes, alkynes, including cyclic versions thereof, and further including straight- and branched-chain arrangements, and all stereo and position isomers as well. Unless expressly stated otherwise, an aliphatic group contains from one to twenty-five carbon atoms; for example, from one to fifteen, from one to ten, from one to six, or from one to four carbon atoms. The term "lower aliphatic" refers to an aliphatic group containing from one to ten carbon atoms. An aliphatic chain may be substituted or unsubstituted. Unless expressly referred to as an "unsubstituted aliphatic," an aliphatic groups can either be unsubstituted or substituted. An aliphatic group can be substituted with one or more substituents (up to two substituents for each methylene carbon in an aliphatic chain, or up to one substituent for each carbon of a —C=C— double bond in an aliphatic chain, or up to one substituent for a carbon of a terminal methine group). Exemplary aliphatic substituents include, for instance, amino, amide, sulfonamide, halo, cyano, carboxy, hydroxyl, mercapto, trifluoromethyl, alkyl, alkoxy, alkylthio, thioalkoxy, arylalkyl, heteroaryl, alkylamino, dialkylamino, or other functionality. As used herein, the term "hydrocarbon" refers to an unsubstituted aliphatic group.

Alkyl refers to a hydrocarbon group having a saturated carbon chain. The chain may be cyclic, branched or unbranched. The terms alkenyl and alkynyl refer to hydrocarbon groups having carbon chains containing one or more double or triple bonds, respectively.

Carboxylic acid: A chemical compound having the general formula RCOOH where R denotes virtually any group, including aliphatic, substituted aliphatic, aryl, arylalkyl, heteroaryl, etc.

Catalyst: As used herein, a catalyst is a substance that enables a reaction to proceed under different conditions (e.g., at a lower temperature and/or at a significantly faster rate) than otherwise possible.

Dispersity: A measure of the heterogeneity of particle sizes in a population of particles. Particles are considered to be monodisperse if the particles have substantially the same size, shape, and/or mass. Particles are considered to be polydisperse if the size, shape, and/or mass distribution is variable. As used herein, the term "monodisperse" means that the relative size variation is ≤20%, such as ≤10%, ≤5%, ≤1%, from 0.0% to 20%, 0.01% to 20%, 0.1% to 20%, 0.1% to 10%, 0.1% to 5%, or 1% to 10%. For example, if the average particle size is 5 mm and the dispersity is ≤20%, then the size deviation is ≤1 mm.

Ester: A chemical compound derived from an organic acid (general formula: $RCO_2H$) where the hydrogen of the —OH (hydroxyl) group is replaced by an aliphatic, alkyl or aryl group. A general formula for an ester derived from an organic acid is shown below:

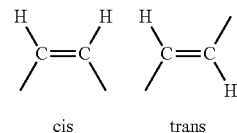

where R and R' denote virtually any group, including aliphatic, substituted aliphatic, aryl, arylalkyl, heteroaryl, etc.

Esterification: A chemical reaction, typically between an alcohol and a carboxylic acid, which forms an ester.

Inject: As used herein, the term "inject" means to add a relatively small amount of a reagent or solution into a relatively large amount of another solution or mixture. In some embodiments, injection is performed at a substantially steady rate over a period of time, e.g., up to 0.5 mL/minute, such as at a rate of 0.1 to 0.5 mL/minute or a rate of 0.2 mL/minute.

Ligand: A molecule or ion that binds to a metal cation via an electron pair on the ligand, thereby forming a complex.

Nanoparticle: A nanoscale particle with a size that is measured in nanometers, for example, a nanoscopic particle that has at least one dimension of less than about 100 nm. A nanocrystal is a nanoscale crystal.

Saturated: As used herein, the term "saturated" refers to an aliphatic group without any double or triple bonds.

Soluble: Capable of becoming molecularly or ionically dispersed in a solvent to form a homogeneous solution.

A solution is a homogeneous mixture composed of two or more substances. A solute (minor component) is dissolved in a solvent (major component).

Unsaturated: As used herein, the term "unsaturated" refers to an aliphatic group having at least one double or triple bond. Unsaturated double bonds may have a cis or a trans conformation. In the cis conformation, hydrogen atoms are on the same side of the double bond. In the trans conformation, hydrogen atoms are on opposite sides of the double bond.

II. Metal Oxide and Core/Shell Nanoparticle Synthesis

A. Metal Oxide Nanoparticles

Methods for making monodispersed crystalline metal oxide nanoparticles, or nanocrystals, by an esterification reaction at temperatures significantly lower than those utilized for pyrolysis (i.e., greater than 300° C.) are disclosed. The reaction temperature is lower than the thermal decomposition temperatures of the precursors. Embodiments of the disclosed methods comprise combining a solution including a metal carboxylate and a carboxylic acid with a solvent comprising an alcohol to form metal oxide nanoparticles. In some embodiments, the alcohol is anhydrous or substantially anhydrous. In some embodiments, the solvent is preheated to a temperature, $T_1$, before combining the solution with the solvent, and the combined solution and solvent are maintained at a reaction temperature, $T_2$, for an effective period of time to form the metal oxide nanoparticles. Advantageously, $T_1$ and $T_2$ are less than a thermal decomposition temperature of the metal carboxylate. In certain embodiments, $T_1$ and/or $T_2$ is <290° C., such as ≤250° C., ≤240° C., ≤230° C., ≤200° C., ≤175° C., or ≤150° C., such as 100-290° C., 125-250° C., 150-240° C., 160-230° C., or 200-230° C. In some embodiments, the effective period of time is ≤60 minutes, ≤30 minutes, ≤20 minutes, or ≤15 minutes, such as 1-60 minutes, 5-30 minutes, 5-20 minutes, or 10-20 minutes. Typically, the reaction is performed at atmospheric pressure.

Embodiments of the disclosed methods facilitate more precise introduction of framework, dopant, and/or shell metals, as well as increased yields compared to conventional methods and/or shortened reaction times to produce crystalline nanoparticles compared to conventional methods. For example, certain embodiments of the disclosed methods provide a metal oxide nanoparticle yield of at least 90%, such as 90-95%. In addition to be useful for batch-type reactions, certain embodiments of the disclosed methods are suitable for use in continuous-flow reactors due to the rapid nature of the reaction.

FIG. 1 illustrates one embodiment of a method for synthesizing metal oxide nanocrystals by esterification using a metal carboxylate precursor and a solvent comprising an alcohol. With respect to FIG. 1, M is a metal. L designates the various ligands that are bound to the metal throughout the reaction lifetime, including acid, hydroxy, other metal oxide fragments, and alcohol. R and R' independently are aliphatic. The variables a, b, x, y, and z are positive integers that vary as needed to satisfy valence requirements. As shown in FIG. 1, a metal carboxylate precursor, $L_2M(O_2CR)$, reacts with an alcohol R'OH to produce an ester, $RCO_2R'$, and a metal hydroxide, $L_2MOH$. $L_2MOH$ reacts to form $(M_xO_y)_z(O_2CR)_a(OR')_b$ and $H_2O$. A person of ordinary skill in the art will understand that FIG. 1 illustrates an exemplary reaction, and that the actual stoichiometry of L, M, and —$O_2CR$ or —OH may vary.

Suitable metals, M, include group IIIA metals, group IVA metals, and transition metals. In some embodiments, M is manganese, iron, cobalt, zinc, tin, indium, gallium, or a combination thereof.

In some embodiments, R is saturated or unsaturated C1-C21 aliphatic, and R' is saturated or unsaturated C2-C22 aliphatic. R and R' may have aliphatic chains with a similar number of carbon atoms, e.g., the aliphatic chains may differ by five or fewer carbon atoms in length. In certain embodiments, R' has a linear aliphatic chain that is one carbon atom longer than a linear aliphatic chain of R, i.e., R' is $RCH_2$—. In some embodiments, R and R' are saturated hydrocarbons. In one embodiment, R is n-pentyl and R' is n-hexyl. In certain embodiments, R is an unsaturated C13-C21 hydrocarbon, and R' is an unsaturated C14-C22 hydrocarbon. In one embodiment, R and R' are cis-unsaturated hydrocarbons. In some embodiments, R is a cis-C17 unsaturated hydrocarbon, and R' is a cis-C18 unsaturated hydrocarbon. In one example, RCOOH is oleic acid, $CH_3(CH_2)_7CH=CH(CH_2)_7COOH$, and R' is oleyl alcohol, $CH_3(CH_2)_7CH=CH(CH_2)_8OH$.

Suitable cis-unsaturated carboxylic acids may include, but are not limited to, myristoleic acid, palmitoleic acid, sapienic acid, oleic acid, linoleic acid, linolenic acid, arachidonic acid, eicosapentaenoic acid, erucic acid, and docosahexaenoic acid. Other suitable carboxylic acids may include, but are not limited to, hexanoic (caproic) acid, heptanoic (enanthic) acid, octanoic (caprylic) acid, nonanoic (pelargonic) acid, decanoic (capric) acid, undecanoic acid, dodecanoic (lauric) acid, tridecanoic acid, tetradecanoic (myristic) acid, pentadecanoic acid, hexadecanoic (palmitic) acid, heptadecanoic (margaric) acid, octadecanoic (stearic) acid, elaidic acid, vaccenic acid, linolaidic acid, and icosanoic (arachidic) acid.

In some embodiments, R'OH is a liquid at temperatures less than 200° C., less than 150° C., less than 100° C., or at ambient temperature. In one embodiment, R'OH is a liquid at temperatures less than 100° C. In another embodiment, R'OH is a liquid at ambient temperature. Suitable alcohols include, but are not limited to, alcohols corresponding to any of the foregoing carboxylic acids, e.g., C2-C22 aliphatic alcohols. In some embodiments, the solvent comprises at least 60% R'OH, at least 70% R'OH, at least 80% R'OH, at least 85% R'OH, least 90% R'OH, or at least 95% R'OH. In certain embodiments, the solvent consists essentially of R'OH, other C2-C22 aliphatic alcohols, and water. The solvent may be anhydrous or essentially anhydrous, consisting essentially of R'OH and other C2-C22 aliphatic alcohols.

In some embodiments, R is selected such that $L_2M(O_2CR)$ is soluble in R'OH at temperatures ≤270° C., ≤240° C., ≤200° C., ≤150° C., ≤100° C., or at ambient temperature. For example, R may be selected such that at least 0.1 mg, at least 0.2 mg, at least 0.5 mg, or at least 1 mg $L_2M(O_2CR)$ is soluble in 1 mL R'OH at a specified temperature. In one embodiment, R is selected such that $L_2M(O_2CR)$ is soluble in R'OH at temperatures less than 100° C. In another embodiment, R is selected such that $L_2M(O_2CR)$ is soluble in R'OH at ambient temperature.

The metal carboxylate precursor, $L_2M(O_2CR)$, may be prepared by any suitable method. In some embodiments, a short-chain metal carboxylate (e.g., a C1-C5 metal carboxylate, such as a metal formate, metal acetate, metal propionate, metal butyrate, or metal pentanoate) is reacted with RCOOH to form $L_2M(O_2CR)$. In certain embodiments, a metal acetate is reacted with RCOOH to form $L_2M(O_2CR)$. For example, the metal acetate may be heated with hexanoic acid or oleic acid to form a metal hexanoate or a metal oleate, respectively.

The metal carboxylate/carboxylic acid mixture may be combined, without further purification, with the solvent comprising, or consisting essentially of, R'OH. Rapid reaction between the alcohol and metal carboxylate occurs to form an ester and a metal hydroxy species, as shown below in exemplary equation (1) where the metal is indium. Given the thermal stability of indium oleate at 230° C., but its rapid reaction to produce ester in the presence of oleyl alcohol, the initial step of the synthesis is the reaction of the alcohol with the metal carboxylate to form the ester and a metal hydroxy species (Eqn. 1). Although IR studies suggest that the ester formation continues, the amount of signal due to the complexed oleate does not decrease until all of the free oleic acid is consumed. Given that esterification at this temperature does not occur without the metal, the continued production of ester suggests that the free carboxylic acid is being consumed by a metal-catalyzed esterification reaction (Eqn. 2). Later in the addition, it is also possible that the growing nanocrystals can catalyze this reaction. Once the concentration of the indium hydroxy species increases, it can condense with other hydroxy species in a condensation reaction to nucleate and grow nanocrystals (Eqn. 3). Nanocrystal formation by condensation of the metal hydroxide species is supported by other examples in the literature (e.g., Kwon et al., *Acc. Chem. Res.* 2008, 41, 1696-1709) and studies of the thermal decomposition of hydroxy indium(III) diacetate (Sawada et al., *J. Mass Spectrom. Soc. Jpn.* 1998, 46, 292-295). In the latter case, decomposition begins at 207° C. producing water and acetic acid. This finding is also consistent with the observation that at lower temperatures (180-200° C.) the acid is consumed by esterification, but there is no condensation to produce nanoparticles. The presence of some surface hydroxy groups observed in the XPS is consistent with a growth mechanism involving M-OH species.

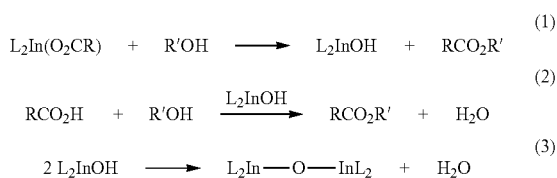

$$L_2In(O_2CR) + R'OH \longrightarrow L_2InOH + RCO_2R' \quad (1)$$

$$RCO_2H + R'OH \xrightarrow{L_2InOH} RCO_2R' + H_2O \quad (2)$$

$$2\ L_2InOH \longrightarrow L_2In-O-InL_2 + H_2O \quad (3)$$

The water generated in Equations (2) and (3) might accelerate the hydrolysis of metal carboxylates to metal hydroxides that are subsequently dehydrated to metal oxides (Eqn. (3)). However, in some embodiments, superior control over nanocrystal formation occurs when water is generated relatively slowly and swept away by the nitrogen flow. Without wishing to be bound by a particular theory of operation, based upon these observations, controls and spectroscopic studies and the similar reactivity observed for the other metal oxides studied, it is believed that Equations (1)-(3) produce the overall nanocrystal formation reaction shown in FIG. 1. The initial reaction between the metal oleate and the solvent generates the ester and the metal hydroxy species. The hydroxy species can dehydrate to form M-O-M bonds, but in the early stages of reaction when the concentration of oleic acid is higher, a metal-catalyzed esterification (the lower loop in the scheme) competes with dehydration. The fact that the IR signals due to the metal oleate do not decrease until after the free acid is consumed is consistent with this reaction pathway. As the free acid is consumed, the dehydration reaction, which is facile at about 207° C., competes and leads to nanocrystal formation.

Figure 2:
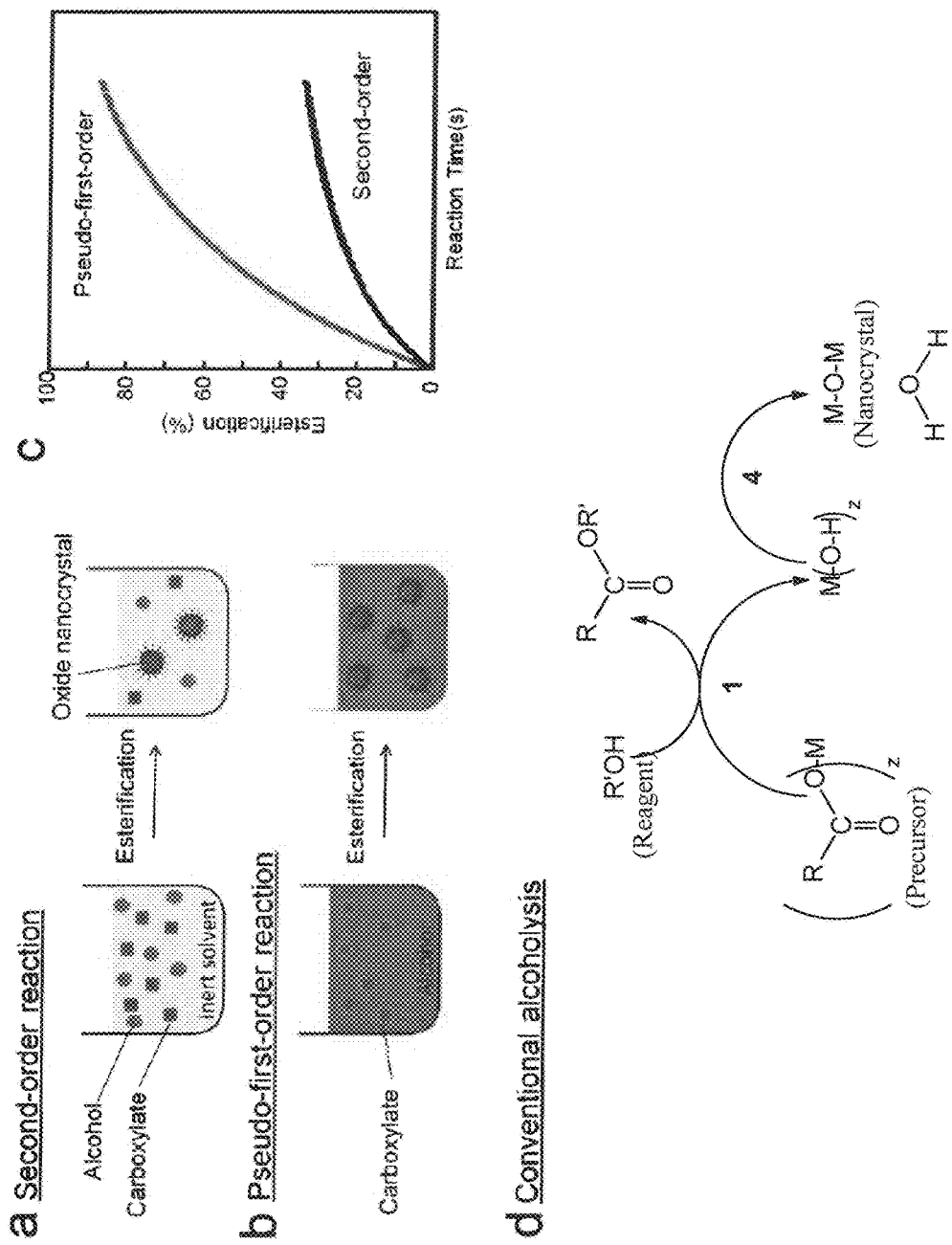
FIG. 2a illustrates a second-order reaction between an alcohol and a metal carboxylate in an inert solvent.
FIG. 2b illustrates a pseudo-first-order reaction between an alcohol and a metal carboxylate where the alcohol also functions as the solvent.
FIG. 2c is a graph comparing the rates of esterification in a pseudo-first-order reaction and a second-order reaction.
FIG. 2d is a scheme illustrating one embodiment of a conventional alcoholysis reaction for making metal oxide nanocrystals.

As shown in FIG. 2a, conventional alcoholysis occurs when an alcohol, used as a reagent (i.e., not in a large molar excess as a solvent), is injected into a hot solution of metal carboxylate in a non-reactive organic solvent (e.g., 1-octadecene). The reaction is second-order, and its rate is dictated by the concentrations of metal carboxylate and alcohol (reaction step 1, FIG. 2d). As the reaction progresses, the concentrations of both the metal carboxylate and the alcohol decrease. As the concentrations decrease, the collision frequency between the metal carboxylate and the alcohol decreases, and the conversion rate from metal carboxylate to metal hydroxide slows. As a consequence, higher temperatures are required to maintain a rate that will drive the reaction to completion and/or produce reactive species through thermal decomposition. Typically, reaction temperatures near 300° C. for several hours are needed to complete the alcoholysis reaction and produce crystalline products.

In contrast, in embodiments of the disclosed low-temperature esterification process, the non-reactive organic solvent is replaced with alcohol (FIGS. 1, 2b), thereby making the alcohol the solvent. The large excess of alcohol compared to metal carboxylate makes the process a pseudo-first-order reaction because the collision frequency between the metal carboxylate and alcohol molecules remains high (FIGS. 2b, 2c). As a result, the esterification is complete, and the precursor is converted to metal hydroxide much faster (i.e., within minutes) than the second-order esterification (FIGS. 2a, 2c), even when the process is performed at low temperatures (e.g., ≤230° C.).

The inventors surprisingly discovered that precise control over the metal oxide nanoparticle synthesis is obtainable by using an amount of carboxylic acid that is in stoichiometric excess relative to the metal, but limiting with respect to the alcohol. In other words, [R'OH]>[RCOOH]>[M]. In some embodiments, control is further enhanced by injecting a hot solution comprising metal carboxylate in carboxylic acid into the alcohol wherein the alcohol is present in sufficient amount to act as a solvent, thereby producing a pseudo-first-order reaction. In certain embodiments, [R'OH]>>[RCOOH]>[M] such that [R'OH] changes by less than 10%, less than 5%, or even less than 3% throughout the reaction. For example, [R'OH] may be at least 10× greater than [M], such as at least 20× greater or at least 30× greater. In certain embodiments, a gas, such as nitrogen or air, is flowed across the mixture and/or bubbled through the mixture during the reaction to evaporate and remove water formed in Equations (2) and (3).

Using "matched" reagents improves solubility of the metal carboxylate and carboxylic acid in the alcohol, and increases control over reagent concentrations and reaction kinetics. Thus, in certain embodiments, R' has the chemical structure $RCH_2$—. For instance, in some examples, metal oxide nanoparticles were synthesized using a metal oleate, oleyl alcohol, and oleic acid. Similarly, a metal hexanoate, 1-hexanol, and 1-hexanoic acid could be used.

Figure 3:
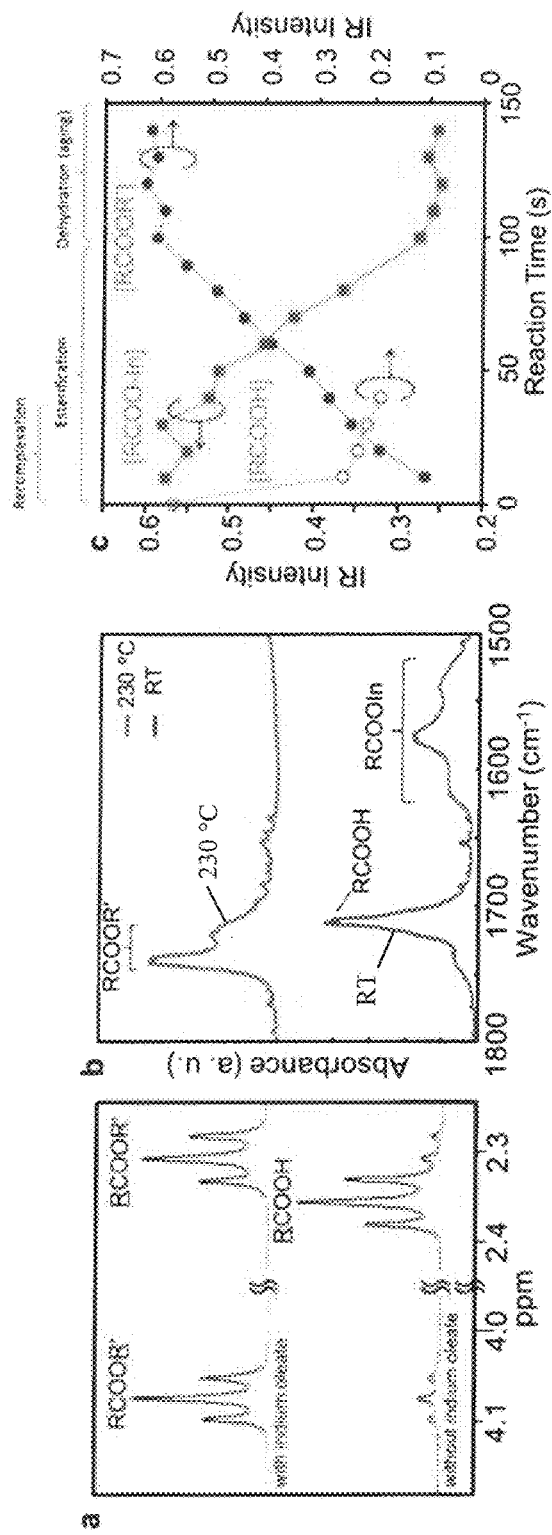
FIG. 3a is partial NMR spectra of mixed solutions of oleyl alcohol and oleic acid with indium oleate complexes at room temperature (lower spectrum) and after heating at 230° C. for 5 minutes (upper spectrum) wherein the indium oleate complex and oleic acid peaks have disappeared.
FIG. 3b is FT-IR spectra of mixed solutions of oleyl alcohol and oleic acid after heating at 230° C. for 5 minutes with indium oleate complexes.
FIG. 3c is a graph showing the conversion of indium oleate complexes to oleyl oleate versus time at 230° C.

FIG. 3c is a graph illustrating time dependence of the esterification and decomposition of one embodiment of an indium oxide synthesis at 230° C. using indium oleate/oleic acid and oleyl alcohol. The reaction was monitored using FT-IR peaks at 1740 $cm^{-1}$ (ester carbonyl stretch) and 1520-1630 $cm^{-1}$ (asymmetric COO stretch from metal carboxylate). Nucleation of $In_2O_3$ started at 60 s. Other metal oleates were shown to display similar reactivities.

B. Core/Shell Nanoparticles

Because the surface of each metal oxide nanoparticle core is terminated by polar metal planes, different metal-oxide shell layers can be deposited onto the metal oxide nanoparticles using layer-by-layer epitaxial growth. Suitable metals for the shells, M', include group IIIA metals, group IVA metals, and transition metals. In some embodiments, M and M' are different metals. In working examples, M' was manganese or gallium.

Embodiments of metal oxide nanoparticles, or cores, are synthesized as described above. The metal oxide cores are dispersed in an alcohol, R'''OH where R''' is as defined previously for R', and heated to a temperature $T_3$ of less than 200° C., such as 150° C. to 200° C. A metal carboxylate comprising R"COO⁻ and a metal M' is added, where R" is as defined previously for R, and the relationship between R" and R''' is as defined previously for R and R'. The reaction is maintained at a reaction temperature, $T_4$, for an effective period of time such that the metal carboxylate reacts with R'OH to produce an ester, RCOOR', and a metal hydroxide comprising M'. The metal hydroxide decomposes via dehydration to form $M'_xO_y$ and $H_2O$ where x and y are as defined previously. In some embodiments, excess carboxylic acid, RCOOH, also is added to the reaction. The metal carboxylate and RCOOH may be combined and heated to a temperature of ≤200° C., such as 150° C. to 200° C. before being added to the metal oxide core/alcohol mixture. In certain embodiments, the metal carboxylate and excess RCOOH are injected into the metal oxide core/alcohol mixture.

In some embodiments, to minimize or prevent nucleation of new nanoparticles from the shell precursor (the metal carboxylate comprising R"COO⁻ and M'), the reaction temperature $T_4$ is less than the nucleation temperature for $M'_xO_y$, and oxygen is excluded. In certain embodiments, $T_4$ is ≤200° C., such as 150-200° C. The effective period of time for the reaction may be at least 5 minutes, at least 10 minutes, at least 30 minutes, 5 to 300 minutes, 10 to 200 minutes, or 30 to 100 minutes. In one example, the effective period of time was 60 minutes.

In working examples, metal core nanoparticles were dissolved in oleyl alcohol and heated to 160° C. under flowing nitrogen. Metal oleates comprising M' were injected into the mixture along with excess oleic acid, and the reaction was maintained at 160° C. for one hour.

In certain embodiments, one or more additional metal oxide shells may be deposited onto the metal oxide core/shell nanoparticles using the same process. The metal for each successive shell may be the same metal or a different metal than the metal of the previous shell.

III. Metal Oxide Nanoparticles

Metal oxide nanoparticles made by embodiments of the disclosed method comprise a group IIIA metal, a group IVA metal, a transition metal, or a combination thereof. In some embodiments, the nanoparticles comprise manganese, iron, cobalt, zinc, tin, indium, or a combination thereof. The nanoparticle properties can be widely tuned, ranging from semiconductors to metals, through selection of the framework metal and by introducing impurities (dopants) into the oxides.

In some embodiments, the nanoparticles are single crystalline. In certain embodiments, the particles have a size dispersity of ≤20%, ≤10%, ≤5%, ≤1%, from 0% to 20%, 0.01% to 20, 0.1% to 20%, 0.1% to 10%, 0.1% to 5%, or 1% to 10%. In some embodiments, the nanoparticles have an average largest dimension of ≤50 nm, ≤20 nm, ≤15 nm, ≤10 nm, or ≤5 nm, such as 1 nm to 20 nm, 1 nm to 15 nm, 1 nm to 10 nm, or 5 nm to 15 nm as determined by particle size analyses using transmission electron microscopy images.

Nanoparticle morphology depends at least in part on chemical structure. For example, spherical particles may dominate when surface defects are needed to minimize surface energies of the nanocrystal. On the other hand, faceted particles have different mechanisms to minimize surface energies. For example, in $In_2O_3$ nanocrystals, {111} facets typically dominate as the most stable planes. However, some embodiments of the disclosed methods produced $In_2O_3$ nanocrystals with a cube morphology having a surface comprising {001} facets. This finding was surprising for $In_2O_3$ because the facets typically are unstable due to their strong polarity. The importance of the surface energies in the growth of $In_2O_3$ nanocrystals has been discussed by using the lowest-indexed crystallographic planes. In general, the lowest-energy plane trend is $\gamma(111)<\gamma(011)<\gamma(211)<\gamma(001)$ (Agoston et al., *Physical Review B* 84, 1-20 (2011)). However, if the $In_2O_3$ nanocrystals were formed via hydroxide species, there are several reports that {001} facets are stable and form cubes (see, e.g., Hu et al., *Materials Chemistry and Physics* 118, 227-280 (2009); Tang et al., *Crystal Growth & Design* 5, 147-150 (2005)). Agoston et al. reported that the {001} planes become more stable than {111} planes ($\gamma(001)<\gamma(111)$) when the surface is terminated by water or hydroxide. Embodiments of the esterification process disclosed herein are consistent with this mechanism since the $In_2O_3$ nanoparticle originated via hydroxides. FIGS. 5a and 5d-5f demonstrate that the $In_2O_3$ nanocrystals are cubes comprising polar, layered structures of metal-oxygen-metal coordination terminated by carboxylic acid molecules on the surfaces.

Indium tin oxide (ITO) nanocrystals synthesized by some embodiments of the disclosed methods are truncated octahedrons surrounded by {001} and {111} facets. In some embodiments, the ITO nanoparticles are monodisperse, and the matrix phase of the nanoparticles is cubic $In_2O_3$ without any different phases. However, the truncated octahedron is an intermediate between a {001}-faceted cube and a {111}-faceted octahedron (Tao et al., *Small* 4, 310-325 (2008)), and may be the predominant structure due to lattice distortion induced by tin doping. Tin doping induces lattice distortion, which changes the nanoparticle shape from a cube to a truncated octahedron.

Figure 7:
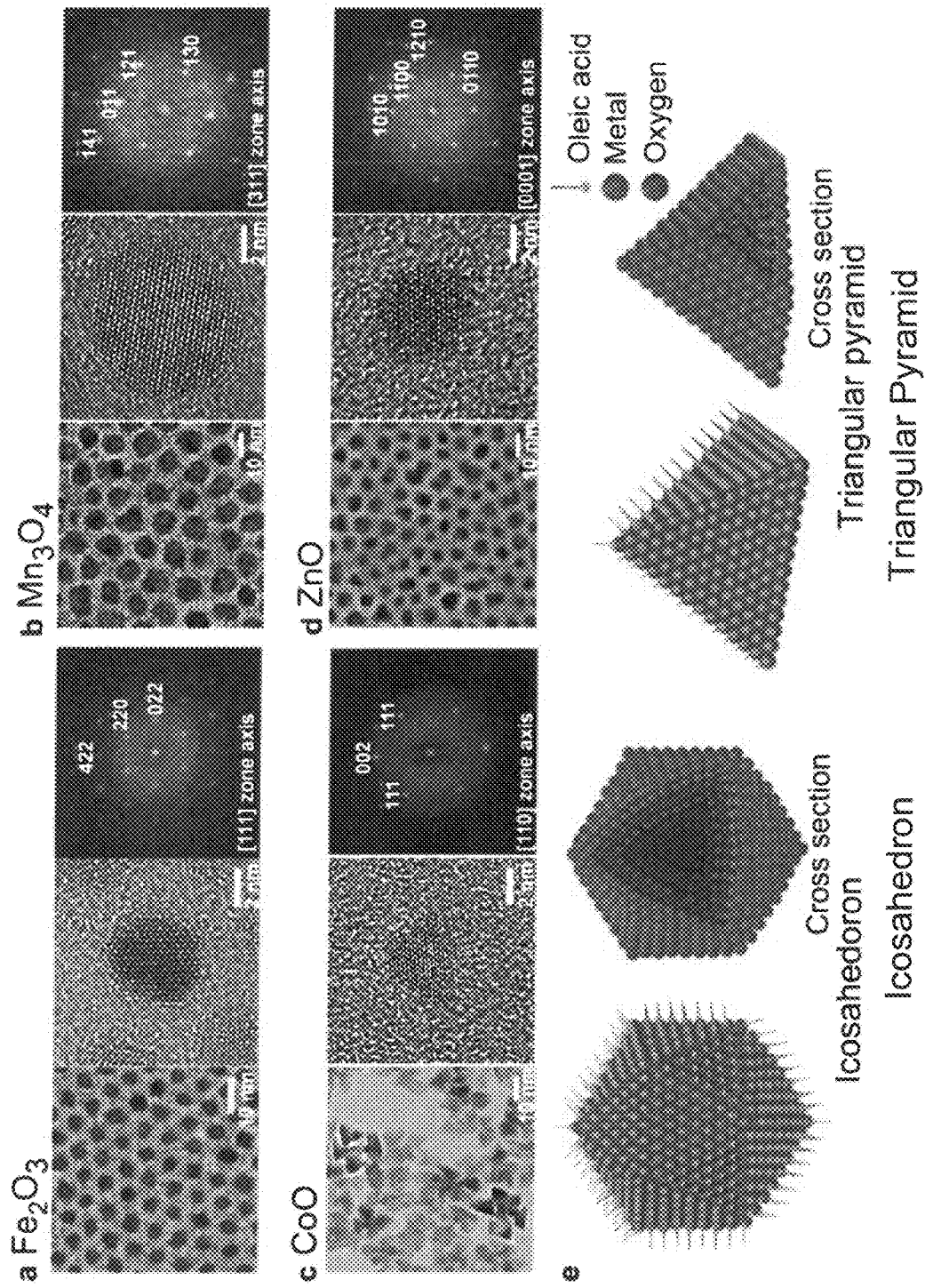
FIGS. 7a-7d are TEM images of Fe$_2$O$_3$, Mn$_3$O$_4$, CoO, and ZnO nanocrystals, respectively, synthesized according to one embodiment of the disclosed methods.
FIG. 7e is a schematic drawing illustrating the structures of a layered icosahedron (left) and a layered triangular pyramid (right).
Figure 8:
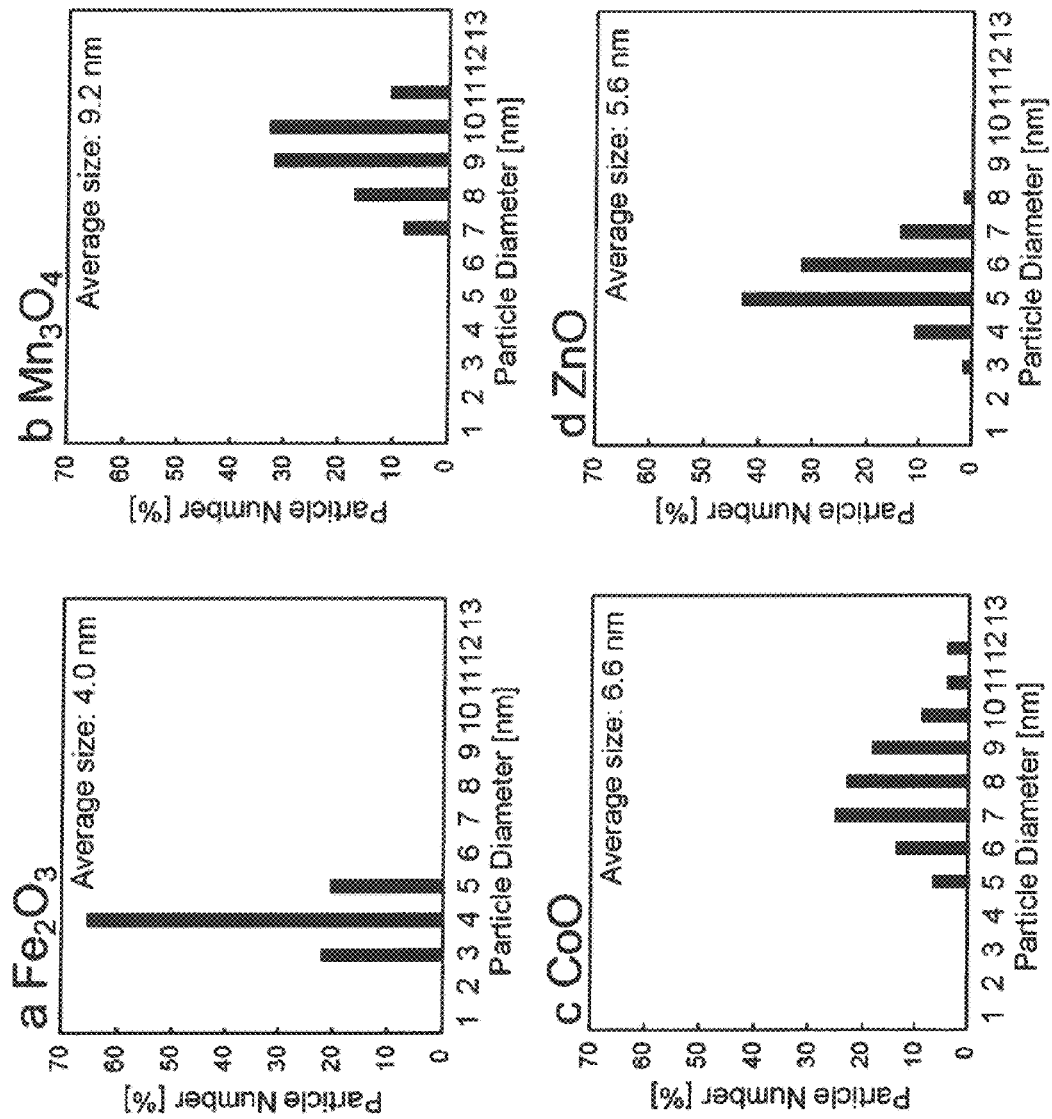
FIGS. 8a-8d are histograms of $\gamma$-$Fe_2O_3$, $Mn_3O_4$, CoO, and ZnO nanocrystal diameters corresponding to the nanocrystals shown in FIGS. 7a-7d.

Some embodiments of $\gamma$-$Fe_2O_3$ and CoO nanocrystals synthesized by the methods disclosed herein have {111} facet planes, which are polar planes analogous to those of $In_2O_3$ nanocrystals. If $\gamma$-$Fe_2O_3$ (space group $P4_132$) and CoO (space group: Fm-3m) are surrounded by {111} planes, the shape is predicted to be an icosahedron, a triangular pyramid, or an octahedron (see, e.g., FIG. 7e). The shapes likely result from interactions between the carboxylic acid stabilizing molecules and the stable polar crystal planes for each shape. Thus, without wishing to be bound by any particular theory of operation, it appears that the carboxylic acid (e.g., oleic acid) has a role in determining crystal shape, as well as acting as a reagent in the esterification.

Thus, in some embodiments, the metal oxide nanoparticles further comprise an outer layer comprising carboxylic acid (RCOOH) and RCOO— ligands. The outer layer may further comprise R'OH, and/or R'O— ligands. The nanoparticles' morphology may be determined in part by the outer carboxylic acid layer. The negative, or partial negative, charge on the oxygen atoms facilitates binding to the positively charged metal atoms on the nanoparticle surfaces. Thus, the metal oxide nanoparticles terminate with an outer layer of metal atoms and associated carboxylic acid molecules, carboxylate ions, and/or alcohol molecules or ions. In some working examples utilizing oleic acid and oleyl alcohol, the nanoparticles terminated with an outer layer composed primarily of oleic acid with 2-11% oleyl alcohol. The morphology is determined by space groups of the crystals (see, e.g., FIG. 7). Advantageously, the use of long-chain fatty acids, e.g., oleic acid, as coordinating ligands in the production of nanoparticles facilitates morphology control while avoiding the toxicity of many surfactants.

IV. Core/Shell Nanoparticles

Among the most interesting classes of nanoparticles are core/shell structures. Inorganic core/shell nanoparticles have become important functional materials because the crystalline shells can expand the range of physical and chemical properties as a class of hybrid nanomaterials. However, their synthesis requires greater control of the growth chemistry. Compared with amorphous shells (e.g. $SiO_2$ or $Al_2O_3$), production of crystalline shells utilizes nanocrystal cores for seed-mediated epitaxial growth in order to prevent undesirable nucleation, dumbbell formation, and aggregation.

Embodiments of the disclosed core/shell nanocrystals include a crystalline metal oxide nanoparticle core as described above and a metal oxide shell. The metal oxide shell comprises a group IIIA metal, a group IVA metal, a transition metal, or a combination thereof. In some embodiments, the shell's metal oxide comprises a different metal than the core metal oxide. The core/shell nanoparticles may include a plurality of metal oxide shells. The core/shell nanoparticles may further comprise an outer layer comprising carboxylic acid molecules and/or carboxylate ligands. The outer layer also may comprise alcohol molecules/ligands.

In some embodiments, the metal oxide shell has a thickness of ≤10 nm, ≤5 nm, or ≤2 nm, such as 1-10 nm, 1-5 nm, or 1-3 nm. In working embodiments, metal oxide shells with a thickness of 2 nm were prepared. The thickness of the deposited metal oxide shell may depend, at least in part, on the concentration of the precursor metal carboxylate, $(RCOO)_zM'$, the concentration of metal oxide cores, the reaction temperature, and/or the reaction time.

Embodiments of $\gamma$-$Fe_2O_3$/MnO and ZnO/$Ga_2O_3$ core/shell nanocrystals were prepared (see Example 5). $\gamma$-$Fe_2O_3$/MnO nanocrystals possess novel magnetic properties as a result of their core/shell structure. Nanocrystalline $\gamma$-$Fe_2O_3$ is well known as a superparamagnetic or ferromagnetic material. If the surface is coated by an anti-ferromagnetic MnO shell, anomalous magnetic exchange coupling can be expected.

ZnO/$Ga_2O_3$ nanocrystals are interesting because of their optical properties. The application of a wide band gap ($E_g$: 4.6 eV, $Ga_2O_3$) semiconducting shell onto a narrow band gap ($E_g$: 3.4 eV, ZnO) core should result in a higher band-edge luminescence than single-component semiconductor nanocrystals (e.g., CdSe—ZnS core/shell quantum dots) because the surface defects of crystal core are passivated by the wide bandgap material. In addition, a $Ga_2O_3$ shell is chemically inert and will prevent dissolution of ZnO under acidic conditions. The dissolution of ZnO not only degrades the nanomaterial, but is also the origin of toxicity for ZnO nanomaterials.

V. Nanoparticle Uses

Embodiments of metal oxide nanoparticles synthesized by the disclosed methods have a range of important applications depending upon the metal oxide produced. Uses for metal oxide nanoparticles made by embodiments of the disclosed method, and nanomaterials (e.g., thin films) comprising the nanoparticles include, but are not limited to, catalysts, energy storage materials (e.g., lithium ion batteries), displays, touch panels, solar cells, light-emitting diodes, sensors, transparent electrodes, and/or battery cathodes. For example, tin-doped indium oxide (ITO) nanoparticles can be used as inks to "print" transparent electrodes for use in the microelectronics industry, such as in display and electronics applications. Metal oxide nanoparticle inks can be deposited, for example, using existing roll-to-roll or ink-jet systems. Thin films comprising embodiments of the disclosed metal oxide nanoparticles can be prepared by any suitable method including, but not limited to, drop-casting, dip-coating, spin-coating, painting, or printing. Film thickness can be varied by repeated coatings.

VI. Examples

Materials:

All chemicals were purchased from Sigma-Aldrich and used as received. As metal precursors, indium (III) acetate (99.99%), iron (II) acetate (99.99%), cobalt (II) acetate (99.995%), tin (IV) acetate (>99%), zinc (II) acetate (99.99%), manganese (II) acetate (98%), gallium acetylacetonate (99.99%) were used. Oleic acid (90% technical grade or 99% analytical standard) was used for producing metal oleates, oleyl alcohol (85% technical grade) was used as solvent.

Characterization:

Proton NMR spectra were collected on a Varian INOVA 300 MHz spectrometer and on Bruker Avance III HD 600 NMR Spectrometer with Prodigy multinuclear broadband BBO Cryoprobe (5 mm sample diameter) at 25° C. in $CDCl_3$ (reference to $\delta$ 7.26) solution. Transmission electron microscopy (TEM) observation was carried out with a FEI Titan TEM operated at 300 kV. Measurements of size distribution of nanocrystals are expressed as a function of the standard deviations. X-ray photoelectron microscopy (XPS) was carried out with a Thermo Scientific ESCALAB 250 X-ray Photoelectron Spectrometer using a monochromatic aluminum K$\alpha$ X-ray source at 20 kV. Nanocrystal samples were drop-cast from a toluene solution onto a clean silicon substrate. The binding energy scale of all measurements was calibrated using the $C_{1s}$ peak at 284.8 eV. TEM samples were prepared by drop-casting or aerosol deposition onto holey carbon grids purchased from Ted Pella. Scanning electron microscopy (SEM) was carried out using a ZEISS Ultra-55 SEM. UV-visible (UV-vis) transmittance spectroscopy was performed on an Ocean Optics Jaz Spectrometer Module with DH-2000-BAL UV-NIR deuterium tungsten halogen light source using 1 cm quartz cuvettes. Photoluminescence spectra were collected on a Hitachi F-4500 Fluorescence Spectrophotometer at room temperature. XRD patterns were recorded on a Phillips X'Pert Panalytical diffractometer with Cu K$\alpha$ (X=0.1541 nm) operating at 50 kV and 30 mA with step size 0.05° with 1 sec time per step. The solid indium oxide sample was fixed to a zero background quartz substrate with hi-vac grease. All other oxides were dissolved in toluene and drop cast onto a zero background quartz substrate and allowed to dry before measurement. The ToF-SIMS (time of flight-secondary ion mass spectrometry) spectra were acquired on a ToF-SIMS IV instrument manufactured by ION-TOF GmbH, Muenster, Germany. The primary ion beam was comprised of $Bi_3+$ ions (25 kV 0.3 pA @ 10 kHz). Spectra were acquired over an area of 100 um×100 urn. The primary ion dose during the acquisitions did not exceed the static limit (defined here as $2\times10^{12}$ ions/cm2). Two drops of 5 mg/mL toluene solutions were deposited on freshly cleaved mica and dried before measurements.

General Preparation of Metal Oxide Nanocrystals:

The appropriate metal acetate (1 mmol) was mixed with oleic acid (2 mL) in a 15 mL glass vial and heated to 150° C. for 30 min (or one hour in the case of indium acetate) under a slow flow of nitrogen to generate the metal oleate complexes. The acetic acid boiled off during the reaction. Conversion to the oleate complex was confirmed by proton NMR. The metal oleate complexes can be synthesized and isolated by other methods described in the literature.

Oleyl alcohol (12.5 mL) was heated to 230° C. in a 50 mL two-necked flask that had one neck fitted with a septum. The liquid was stirred magnetically at a rate sufficient to create a vortex down to the stir bar. Dry nitrogen was introduced through the septum via a 20 gauge stainless needle and the gas flow rate held at 1-5 sccm. The temperature of the oleyl alcohol was maintained using a heating mantle supplied by a temperature controller connected to a stainless thermocouple inserted through the septum into the liquid. The second neck of the flask was left open to atmosphere to allow nitrogen and water vapor to escape from the flask without condensation. If water condenses within the flask and drips into the reaction mixture, rapid hydrolysis of the metal precursor leads to immediate precipitation of agglomerated solid. A person of ordinary skill in the art will understand that other equipment configurations may be suitable as long as water vapor is allowed to escape from the flask.

The hot metal oleate/oleic acid solution was injected through the septum from a 10 mL polypropylene syringe with a stainless 20 gauge needle with a syringe pump at 0.2 mL/min. During addition of the metal oleate precursor, the color of the reaction mixture changed from clear to colored. A continuous stream of water bubbles occurred throughout the transformation. The flow of nitrogen through the headspace of the flask swept the water out of the reaction mixture through the open neck. After the addition was complete, the solution was kept for 20 min at 230° C. with vigorous stirring. The reaction mixture was then cooled to room temperature, and a mixture of 25 mL of ethanol and 5 mL of methanol was added to precipitate the nanoparticles. The precipitate was isolated by centrifugation for 30 min at 7500 rpm. The solid product was washed six times with ethanol and then dissolved in toluene. The resulting toluene solution was centrifuged for 5 min at 5500 rpm to remove any insoluble solids. There should be no insoluble material after this centrifugation step.

The percent yield of each nanocrystal core was calculated from the mass of inorganic core material obtained (determined from the mass obtained and the percent inorganic material remaining after heating to 500° C. in the TGA) and the theoretical yield based upon the metal salt. The size, size distribution and shape of the resulting nanocrystals were determined by TEM. The core composition of the nanocrystals was determined through a combination of XRD and XPS. The composition of the ligand shells was determined by ToF-SIMS and XPS.

Synthesis of Oleic Acid-Stabilized Indium Oxide Nanocrystals (1):

Nanocrystals were prepared using the standard preparation outlined above. Briefly, indium (III) acetate (0.292 g, 1 mmol) was mixed with oleic acid (2 mL), then heated at 150° C. for 1 hour under flowing nitrogen to produce a clear, yellowish solution of indium oleate. This solution was added to oleyl alcohol (12.5 mL) at 0.2 mL/min. During addition of the indium oleate precursor, the color of the reaction mixture changed from a clear to light yellow and then a darker yellow solution of indium oxide nanocrystals during the 20 minutes of extended heating. After cooling to room temperature, precipitation and washing, the nanocrystals were collected by dissolving the residue in toluene and then evaporating the solvent by rotoevaporation to yield 159 mg (97% yield calculated for the indium oxide core) of light yellow solid. The resulting nanocrystals were 7.2 nm (±0.7 nm) $In_2O_3$(oleic acid)$_{98\%}$(oleyl alcohol)$_{2\%}$.

Synthesis of Oleic Acid-Stabilized Iron Oxide Nanocrystals (2):

Nanocrystals were prepared using the standard preparation outlined above. Briefly, iron (II) acetate (0.174 g, 1 mmol) was mixed with oleic acid (2 mL), then heated at 150° C. for 30 min under flowing nitrogen to produce a clear brown solution of iron oleate. This solution was added to oleyl alcohol (12.5 mL) at 0.2 mL/min. During addition of the iron oleate precursor, the color of the reaction mixture changed from a clear to a dark brown solution of iron oxide nanocrystals that persisted through the 20-minute heating period. After cooling to room temperature, precipitation and washing, the nanocrystals were collected by dissolving the residue in toluene and then evaporating the solvent by rotoevaporation to yield 90 mg (80% yield, calculated for iron oxide core) of a dark brown solid. The resulting nanocrystals were 4.0 nm (±0.3 nm) $\gamma$-$Fe_2O_3$(oleic acid)$_{89\%}$(oleyl alcohol)$_{11}$%.

Synthesis of Oleic Acid-Stabilized Manganese Oxide Nanocrystals (3):

Nanocrystals were prepared using the standard preparation outlined above. Briefly, manganese (II) acetate (0.173 g, 1 mmol) was mixed with oleic acid (2 mL), then heated at 150° C. for 30 min under flow of nitrogen to produce a clear brownish solution of manganese oleate. This solution was added to oleyl alcohol (12.5 mL) at 0.2 mL/min. During addition of the manganese oleate precursor, the color of the reaction mixture changed from a clear to a dark brown solution of manganese oxide nanocrystals during 20 minutes of reaction. After cooling to room temperature, precipitation and washing, the nanocrystals were collected by dissolving the residue in toluene and then evaporating the solvent by rotoevaporation to yield 76 mg (81% yield calculated for $Mn_3O_4$) of a dark brown solid. The resulting nanocrystals were 9.2 nm (±1.1 nm) $Mn_3O_4$(oleic acid)$_{93}$%(oleyl alcohol)$_{7\%}$.

Synthesis of Oleic Acid-Stabilized Cobalt Oxide Nanocrystals (4):

Nanocrystals were prepared using the standard preparation outlined above. Briefly, cobalt (II) acetate (0.177 g, 1 mmol) was mixed with oleic acid (2 mL), then heated at 150° C. for 30 min under flow of nitrogen to produce a clear violet solution of cobalt oleate described in (1). This solution was added to oleyl alcohol (12.5 ml) at 0.2 mL/min. During addition of the cobalt oleate precursor, the color of the reaction mixture changed from a clear to a dark brown then a blackish solution of cobalt oxide nanocrystals during 20 minutes of reaction. After cooling to room temperature, precipitation and washing, the nanocrystals were collected by dissolving the residue in toluene and then evaporating the solvent by rotoevaporation to yield 80 mg (72% calculated for cobalt oxide core) of a black solid. If left in solution, these nanocrystals slowly precipitated out of toluene solutions with time. The resulting nanocrystals were 6.6 nm (±1.6 nm) CoO(oleic acid)$_{93}$%(oleyl alcohol)$_7$%.

Synthesis of Oleic Acid-Stabilized Zinc Oxide Nanocrystals (5):

Nanocrystals were prepared using the standard preparation outlined above. Briefly, zinc (II) acetate (0.183 g, 1 mmol) was mixed with oleic acid (2 mL), then heated at 150° C. for 30 min under flow of nitrogen to produce a light yellowish solution of zinc oleate described in (1). This solution was added to oleyl alcohol (12.5 mL). Since zinc oleate precipitates below 70° C., the solution was kept at 150° C. during the addition and was performed using a warm Pasteur pipette at about 0.2 mL/min. The color of the reaction mixture changed from a clear to a light yellowish solution of zinc oxide nanocrystals during 20 minutes of reaction. After cooling to room temperature, precipitation and washing, the nanocrystals were collected by dissolving the residue in toluene and then evaporating the solvent by rotoevaporation to yield 45 mg (33% yield based upon the ZnO core) of a yellowish solid. Particles precipitated out of toluene solutions with time. The resulting nanocrystals were 5.6 nm (±1.0 nm) ZnO(oleic acid)$_{92}$%(oleyl alcohol)$_8$%.

Synthesis of Oleic Acid-Stabilized 10% Tin-Doped Indium Oxide Nanocrystals (6):

Nanocrystals were prepared using the standard preparation outlined above for indium acetate, substituting tin acetate for a portion of the indium acetate. Briefly, indium (III) acetate (0.9 mmol) and tin(IV) acetate (0.1 mmol) were mixed with oleic acid (2 mL), then heated to 150° C. for 30 min under flowing of nitrogen to produce a yellowish clear solution of indium-tin oleate. This solution was added to oleyl alcohol (12.5 mL) at 0.2 mL/min. During addition of the indium-tin oleate precursor, the color of the reaction mixture changed from a clear solvent to a yellowish then a dark blue solution of tin-doped indium oxide nanocrystals during 20 minutes of reaction. The resulting nanocrystals were 6.3 nm (±0.6 nm) ($In_{89.5}$% $Sn_{10.5}$%)(oleic acid)$_{98}$% (oleyl alcohol)$_{2\%}$.

Synthesis of Oleic Acid-Stabilized Iron Oxide/Manganese Oxide Core/Shell Nanocrystals (7):

For core/shell structures, the growth of the shell onto the pre-formed core was carried out using a similar procedure as for the main nanocrystal synthesis. A toluene suspension of iron oxide nanocrystals was mixed with oleyl alcohol (12.5 mL). Because oleyl alcohol is so viscous, to speed the dissolution of the nanocrystal powder, a toluene solution of the nanocrystals was added into oleyl alcohol and the toluene removed by rotary evaporation. The manganese oleate precursor, described in (3), was kept at 60° C. and hot-injected at 0.2 mL/min into oleyl alcohol (12.5 mL) that was already heated to 160° C. in a 50 mL three-necked flask with flowing of nitrogen. During addition of the manganese oleate precursor, the color of the reaction mixture did not change from a black clear solution during 20 minutes of reaction.

Synthesis of Zinc Oxide/Gallium Oxide Core/Shell Nanocrystals (8):

A toluene suspension of zinc oxide nanocrystals was mixed with oleyl alcohol (12.5 mL). A toluene solution of the nanocrystals was added into oleyl alcohol and the toluene removed by rotary evaporation. Gallium (III) acetylacetate (1 mmol) was mixed with oleic acid (2 mL), then heated to 150° C. for 30 min under flowing of nitrogen to produce a light yellowish solution of zinc oleate described in (1). The gallium oleate precursor was kept at 60° C. and hot-injected at 0.2 mL/min into oleyl alcohol that was already heated to 160° C. in a 50 mL three-necked flask with flowing of nitrogen. During addition of the gallium oleate precursor, the color of the reaction mixture changed from a light yellowish to a light blue solution during 20 minutes of reaction.

Example 1

Reactivity of Metal Oleate with Oleyl Alcohol and Oleic Acid

Indium acetate and indium oleate thermally decompose at 270° C. and 340° C., respectively. Accordingly, temperatures were kept well below 270° C. to prevent thermal decomposition. As a control, the stability of indium (III) acetate in oleic acid at 250° C. over a two-hour period was confirmed by proton NMR analysis of aliquots of the solution.

Additional observations shed some light on the role of the alcohol, metal complexes, water and excess oleic acid. When indium oleate was heated in oleic acid without added oleyl alcohol at 230° C. for one hour, the solution remained colorless and the proton NMR of the complex remained unchanged. When the complex was added to oleyl alcohol, fine bubbles of water were observed, resulting in the formation of foam across the surface of the reaction mixture. If water was allowed to condense in the reaction vessel and dropped back into the heated solution, the drops boiled violently and precipitate was formed. The same result was obtained if water was deliberately added. Color changes suggest that nanoparticles are forming (confirmed by TEM measurements) within 60 sec. of the beginning of the metal oleate addition. During the timeframe for these reactions, the production of water and formation of the ester did not occur without added metal, suggesting that the metal ion and/or its reaction products act as catalysts for esterification. Finally, the additional oleic acid used during the reaction functioned effectively to control the nucleation of the $In_2O_3$ clusters during the rapid esterification. If no excess oleic acid was used, larger aggregates were formed.

Figure 4:
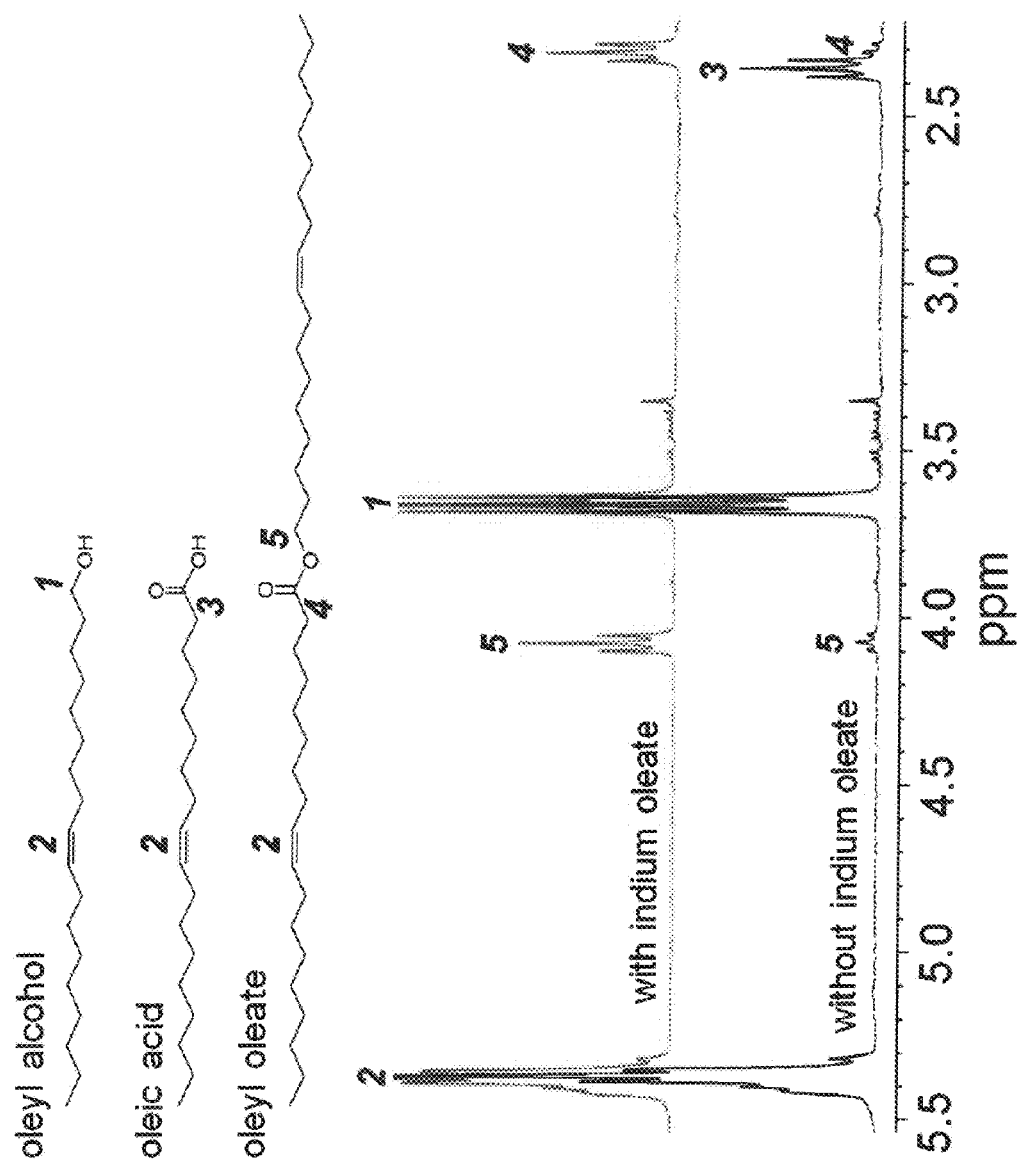
FIG. 4 is NMR spectra of mixed solutions of oleyl alcohol and oleic acid after heating at 200° C. for 5 minutes with, and without, indium oleate complexes. The triplet peaks at (3) indicate a carboxylic acid, and the triplet peaks at (4) and (5) indicate an ester.

These observations were augmented by IR and $^1$H NMR studies of the indium reaction mixtures and several control solutions. FIG. 3a shows NMR spectra of the methylene protons next to the carboxylic acid and ester functionality for mixed solutions of oleic acid and oleyl alcohol after heating at 200° C. for 5 minutes with, and without, indium oleate. Oleic acid (3.3 mmol) and indium oleate (1 mmol) were dissolved in 12.5 mL (33.5 mmol) oleyl alcohol. The triplet peak 3 indicates carboxylic acid (oleic acid) and the triplet peaks 4 and 5 indicate ester (oleyl oleate). From the increase in the two triplet signals associated with the ester and disappearance of the triplet signal due to the acid, it is clear that esterification between oleic acid and oleyl alcohol proceeds only in the presence of indium oleate. Surprisingly, the oleic acid was completely converted to the ester within 5 minutes. The entire NMR spectra are shown in FIG. 4.

FIG. 3b shows FT-IR spectra of mixed solutions of oleic acid and oleyl alcohol with indium oleate at room temperature (lower spectrum) and after heating at 230° C. for 5 minutes (upper spectrum). The amounts of oleyl alcohol, oleic acid, and indium oleate complexes used were 40 mmol, 5 mmol, and 1 mmol, respectively. A sharp peak at 1710 $cm^{-1}$, broad bands ranging from 1520 to 1630 $cm^{-1}$ and from 1720 to 1740 $cm^{-1}$ are assigned to the C=O symmetric stretch from oleic acid, asymmetric COO stretch from metal carboxylates, and ester carbonyl stretch, respectively. At 230° C., the peaks for both oleic acid and indium oleate disappeared, suggesting that the esterification was nearly complete within 5 minutes, consistent with the NMR results.

FIG. 3c shows time dependence of the esterification and decomposition of indium oleate at 230° C. based upon the FT-IR peaks of the acid, metal carboxylate and ester. The IR intensities are normalized to the common peak at 1465 $cm^{-1}$. At the initial stage of esterification (shorter than 50 sec), oleic acid is consumed very rapidly. During this time, the indium oleate remains constant. Once most of the acid is depleted, the indium oleate is consumed rapidly with continued production of ester and nucleation of $In_2O_3$ clusters begins (determined by TEM). The presence of clusters was confirmed at 60 s. Taken together, these results suggest that indium oleate works as a catalyst for the esterification of oleic acid at 230° C. The other metal oleates display similar reactivities. This temperature is much lower than the thermal decomposition temperatures of indium acetate (270° C.) and indium oleate (340° C.).

Additional studies demonstrated that esterification occurs readily down to 140° C. However, nearly all of the indium oleate remains intact at this temperature without nucleation of clusters. The production of water suggests that the reaction involves esterification of oleic acid and oleyl alcohol. During the timeframe for these reactions, the esterification does not proceed without added metal.

Example 2

Indium Oxide Nanoparticle Synthesis and Characterization

A solution of indium oleate and oleic acid was prepared as described above under "General preparation of metal oxide nanocrystals." Traditional "heat up" and "hot injection" approaches to nanocrystal formation were evaluated. In the heat up approach, the metal oleate solution containing a small excess of oleic acid was heated up with a large excess of oleyl alcohol. In the hot injection trials, the metal oleate solution in oleic acid was injected into oleyl alcohol heated to 230° C. Surprisingly, both approaches failed. Using the heat up method, the size of the product nanocrystals could not be controlled. During rapid (~2 mL in 5 sec) hot injection, the formation of water and precipitation of metal oxide solids were observed during and after the injection period.

A slower injection was done at rates slow enough that water could be swept away and precipitation did not occur. A solution of indium (III) oleate and oleic acid (1:3.3) was injected at 0.2 mL/min into a large excess (33.5×) of preheated oleyl alcohol at 230° C., coupled with a slow flush of nitrogen to flush water vapor from the headspace. Once the injection was completed, only 20 minutes of reaction time was needed to complete the metal hydroxide dehydration process to form the nanocrystals. This method led to reproducible nanocrystal formation without precipitation. The nitrogen flow prevented condensation of water droplets during the reaction. Upon addition of the indium oleate solution, the color of the solution turns from pale yellow to yellow, suggesting the formation of nanoparticles during the course of the addition. The presence of nanoparticles was confirmed at 60 seconds into the addition by TEM analysis of an aliquot of the reaction mixture that was removed and quenched by cooling. The nanocrystals were precipitated and washed to remove any free acid, alcohol and ester prior to characterization. Indium oxide nanocrystals were produced in greater than 90% yield, and showed no signs of aggregation in toluene solutions.

Because impurities in solvents and capping agents are known to influence nanocrystal information, $In_2O_3$ nanocrystals produced using reagent grade oleic acid, technical oleic acid, and even olive oil, were compared by TEM. In each case, the same-sized nanocrystals were produced.

Figure 5:
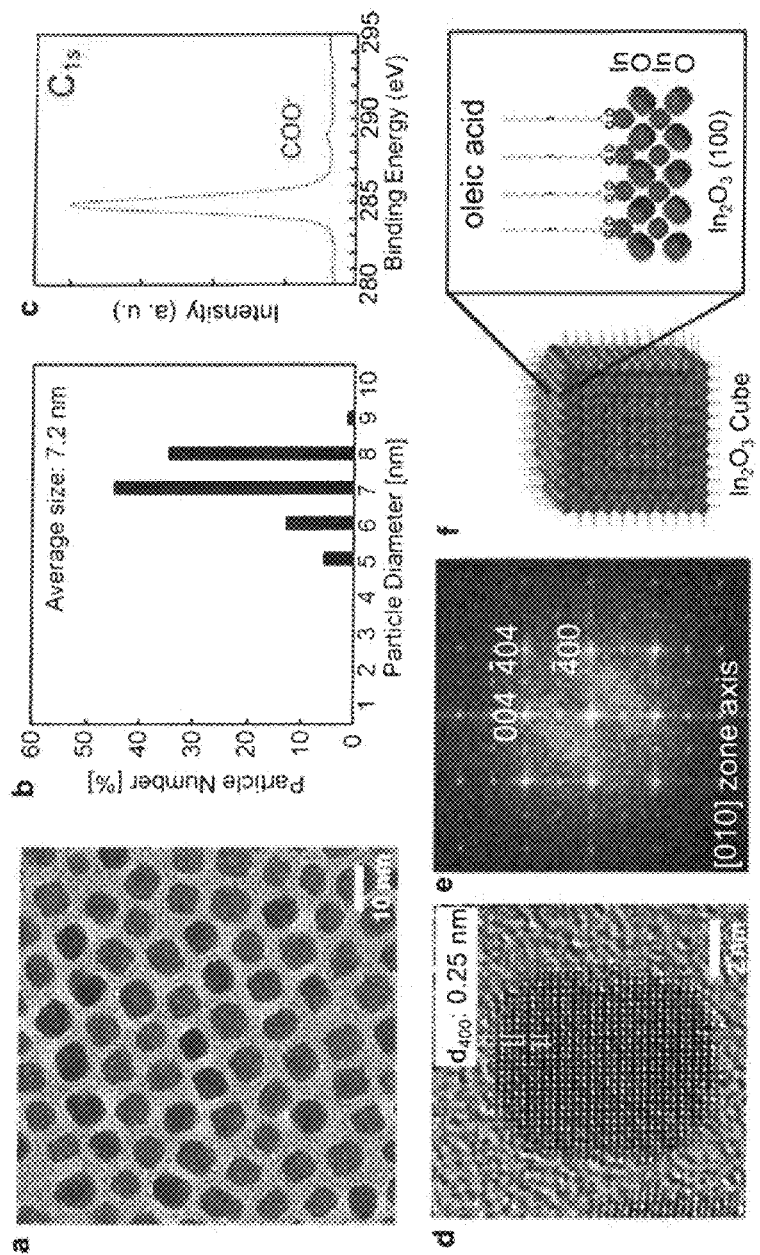

FIGS. 5a and 5d are low-magnification and high-resolution TEM images, respectively, of the indium oxide nanocrystals. In both cases, the nanoparticles were monodispersed and showed no signs of aggregation. X-ray photoelectron spectroscopy (XPS) (FIG. 6a) and powder x-ray diffraction (XRD) (FIG. 6b) confirmed that the structure of the nanocrystal core was $In_2O_3$. The nanocrystals' average diameter was 7.2 nm±0.7 nm as determined from the histogram (FIG. 5b). FIG. 5c shows X-ray photoelectron spectra (XPS) of $C_{1s}$ core levels for $In_2O_3$ nanocrystals. The peak at 289.0 eV is assigned to the carboxylate carbon, suggesting that the surface was passivated by oleic acid. The interparticle edge-to-edge distance as shown in FIG. 5a was 2.5-3.0 nm. This value was shorter than expected for two layers of extended oleic acid (4.0 nm), and implies some degree of interdigitation of the alkyl chains of ligands coordinated to different nanocrystals.

The ligand shell composition was further investigated by ToF-SIMS (negative mode) that confirmed that the ligand shell was primarily oleic acid, containing less than 2% oleyl alcohol. All purified nanocrystals showed a peak at 281.26 m/z ([M-H] for oleic acid), confirming the presence of oleic acid within the stabilizing ligand shell. Weak signals occurred at 265.25 m/z ([M-3H] for oleyl alcohol) suggesting a small amount of that ligand in the shell. As synthesized, the normalized intensity of oleyl alcohol at 265.25 m/z was 16, and the normalized intensity of oleic acid at 281.26 m/z was 1310. These results indicated that the ligand shell included 2% oleyl alcohol and 98% oleic acid. In a control experiment, an $In_2O_3$ sample spiked with additional oleyl acid showed a relative increase in that fragment compared to the other samples, with an oleyl alcohol normalized intensity of 278, and an oleic acid normalized intensity of 3665.

Figure 6A:
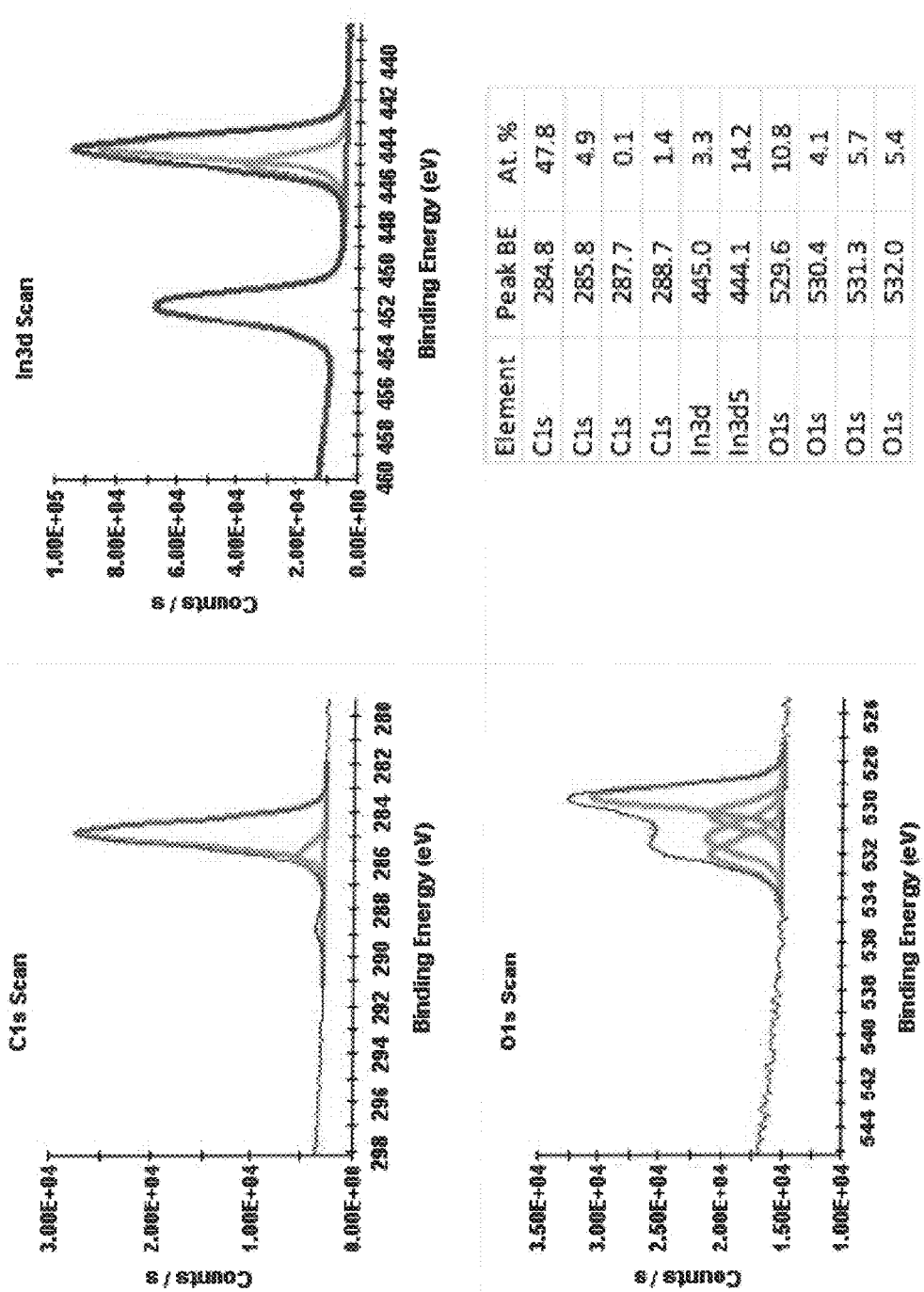
FIG. 6a shows X-ray photoelectron (XPS) spectra and binding energy (C 1s, O 1s, and In 3d) of In$_2$O$_3$ nanocrystals.

FIGS. 5d and 5e show a high-resolution TEM image of a typical $In_2O_3$ nanocrystal and its fast Fourier transform (FFT), respectively. The $In_2O_3$ nanocrystal's shape was a truncated cube, and the surface was surrounded mostly by {001} facets. This finding was surprising for $In_2O_3$ because the {001} facets typically are unstable due to their strong polarity, and therefore {111} facets dominate as the most stable planes. However, as previously discussed, if the $In_2O_3$ nanocrystals were formed via hydroxide species, there are several reports that {001} facets are stable and form cubes (see, e.g., Hu et al., Materials Chemistry and Physics 118, 227-280 (2009); Tang et al., Crystal Growth & Design 5, 147-150 (2005)). Thus, the production of cubic $In_2O_3$ nanocrystals via esterification likely involves hydroxide intermediates. The presence of surface hydroxy species is suggested by a peak at 531.7 eV in the O1s XPS spectrum (FIG. 6a). The {001} facets of $In_2O_3$ nanocrystals are polar, layered structures of metal-oxygen-metal coordination terminated by oleic acid (FIG. 5f).

Example 3

γ-$Fe_2O_3$, $Mn_3O_4$, CoO, and ZnO Synthesis and Characterization

Nanocrystals of γ-$Fe_2O_3$, $Mn_3O_4$, CoO, and ZnO were synthesized as described above under "General preparation of metal oxide nanocrystals," except the syntheses were carried out at 230° C. under flowing dry air. In all cases, this temperature is lower than the precursor decomposition temperature. It was confirmed that the synthesis worked at temperatures as low as 180° C. to synthesize these nanocrystals. Carrying out the reactions in air is advantageous because an inert atmosphere is not needed, and the aerobic environment may enhance oxidation of the nanocrystals, which facilitates crystallization and decreases oxygen vacancies. Antimony, copper, and silver also were evaluated, but did not produce nanocrystals.

Figure 6B:
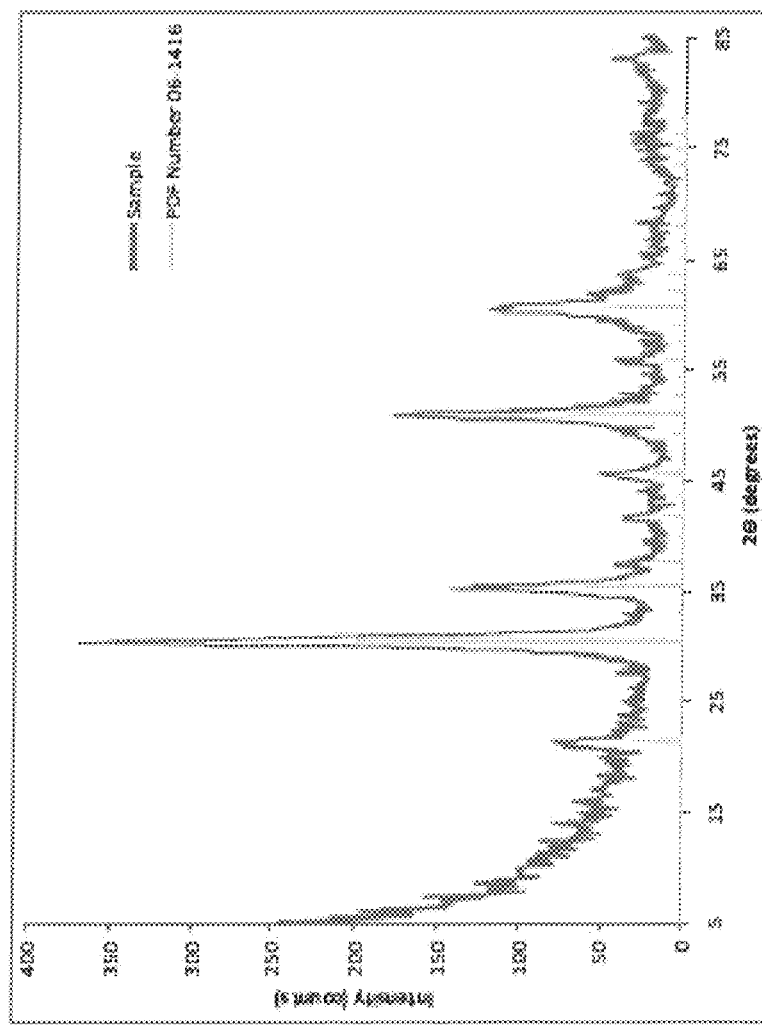
FIG. 6b is an X-ray diffraction (XRD) pattern of In$_2$O$_3$ nanocrystals compared with the known pattern for In$_2$O$_3$ (left); the peak positions and relative peak intensities are shown in the table (right).

FIGS. 7a-7d are TEM images of γ-$Fe_2O_3$, $Mn_3O_4$, CoO, and ZnO nanocrystals, respectively. All examined γ-$Fe_2O_3$, $Mn_3O_4$, CoO, and ZnO nanocrystals were single-crystalline and nearly monodisperse as shown in TEM size analysis graphs (FIGS. 8a-8d, respectively). The crystal structures of each were determined by HR-TEM and confirmed by powder XRD. The γ-$Fe_2O_3$ nanocrystals averaged 4.0 nm±0.3 nm in diameter, and were icosahedrons or octahedrons surrounded by {111} facets (FIG. 6a). The $Mn_3O_4$ (Marokite) nanocrystals were 9.2 nm±1.1 nm in diameter and spherical (FIG. 6b). The CoO nanocrystals were triangular (6.6 nm±1.6 nm on each side) with {111} facets (FIG. 6c). FIG. 6d shows that the ZnO nanocrystals exhibited both spherical and triangular shapes. The average diameter of the spherical ZnO nanoparticles was 5.6 nm±1.0 nm.

Figure 9A:
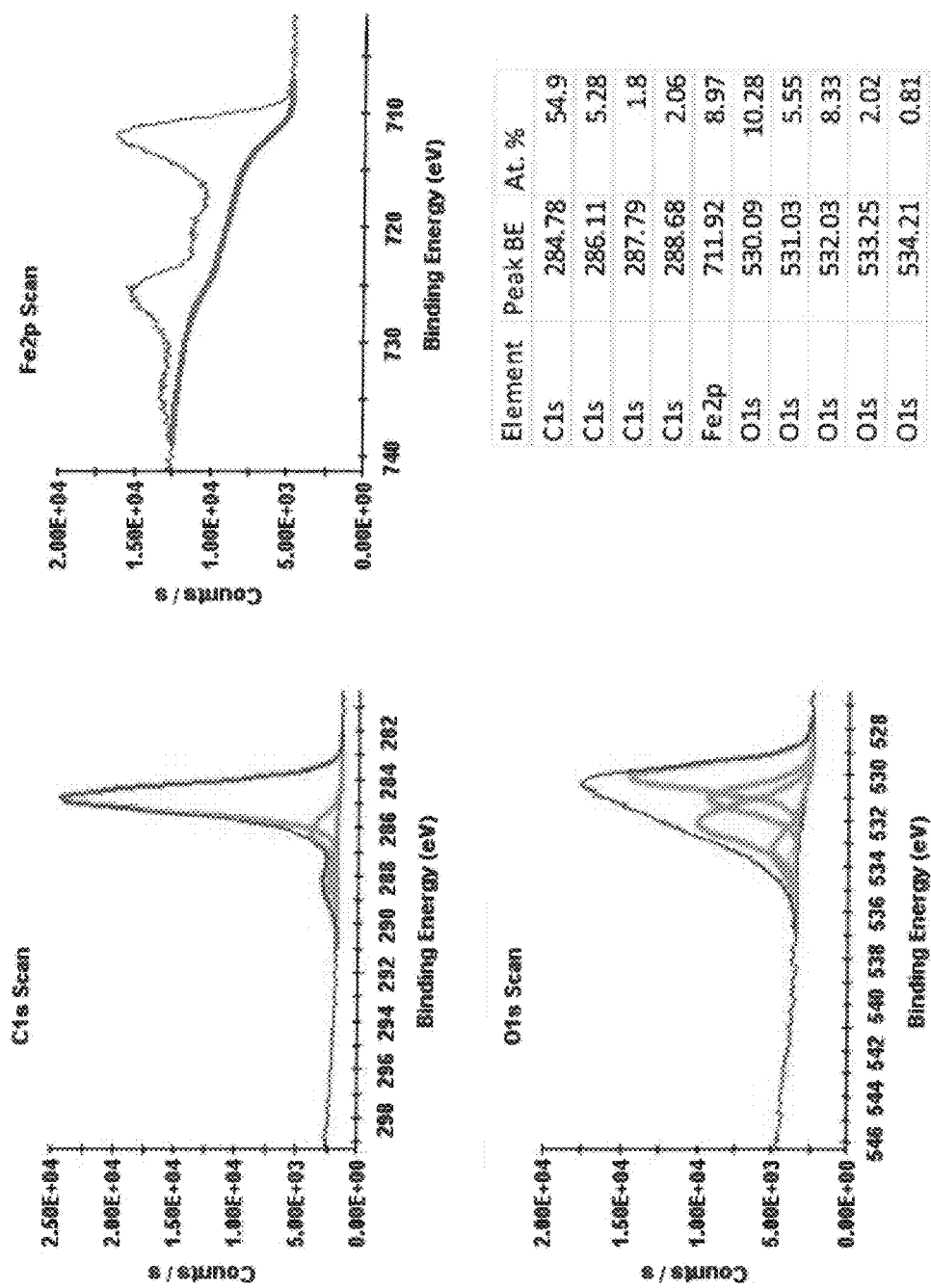
FIG. 9a shows X-ray photoelectron (XPS) spectra and binding energy (C 1s, O 1s, and Fe 2p) of $\gamma$-$Fe_2O_3$ nanocrystals.
Figure 9B:
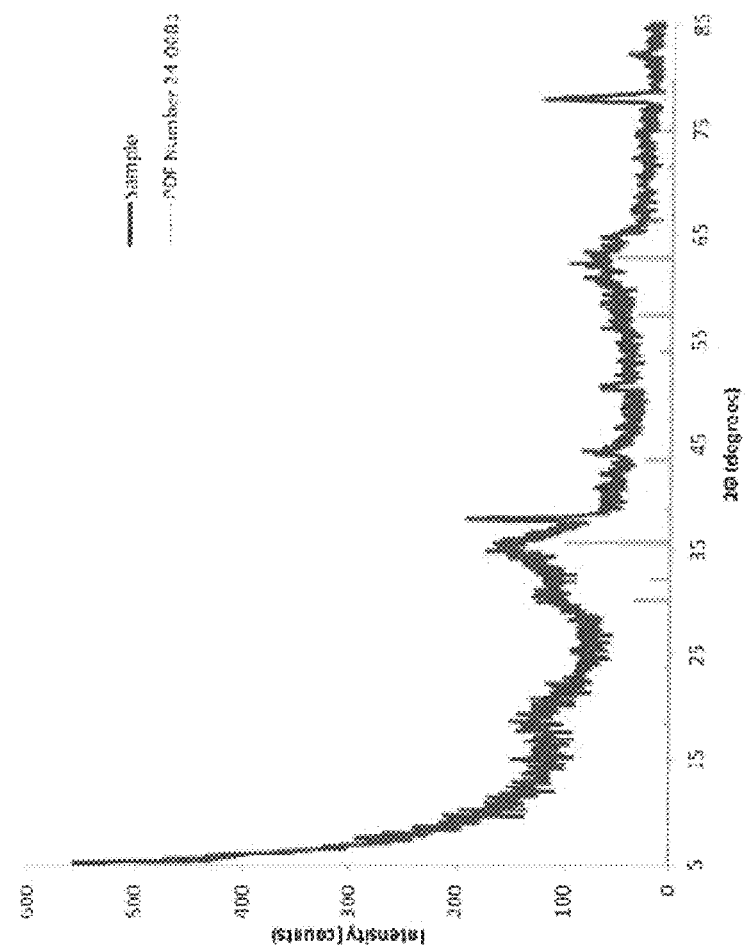
FIG. 9b is an X-ray diffraction (XRD) pattern of $\gamma$-$Fe_2O_3$ nanocrystals compared with the known pattern for $\gamma$-$Fe_2O_3$ (left); the peak positions and relative peak intensities are shown in the table (right).
Figure 10A:
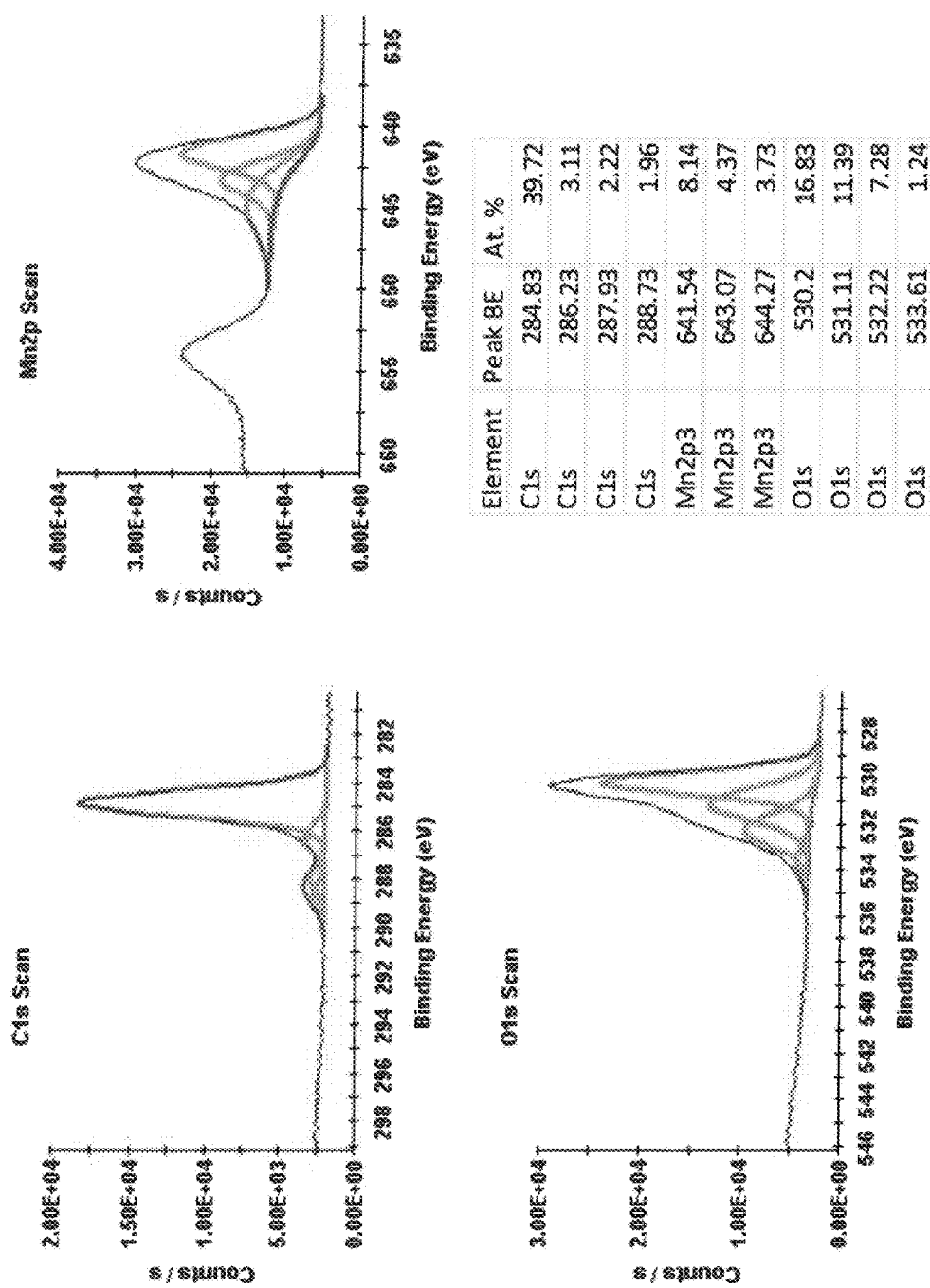
FIG. 10a shows X-ray photoelectron (XPS) spectra and binding energy (C 1s, O 1s, and Mn 2p) of $Mn_3O_4$ nanocrystals.
Figure 10B:
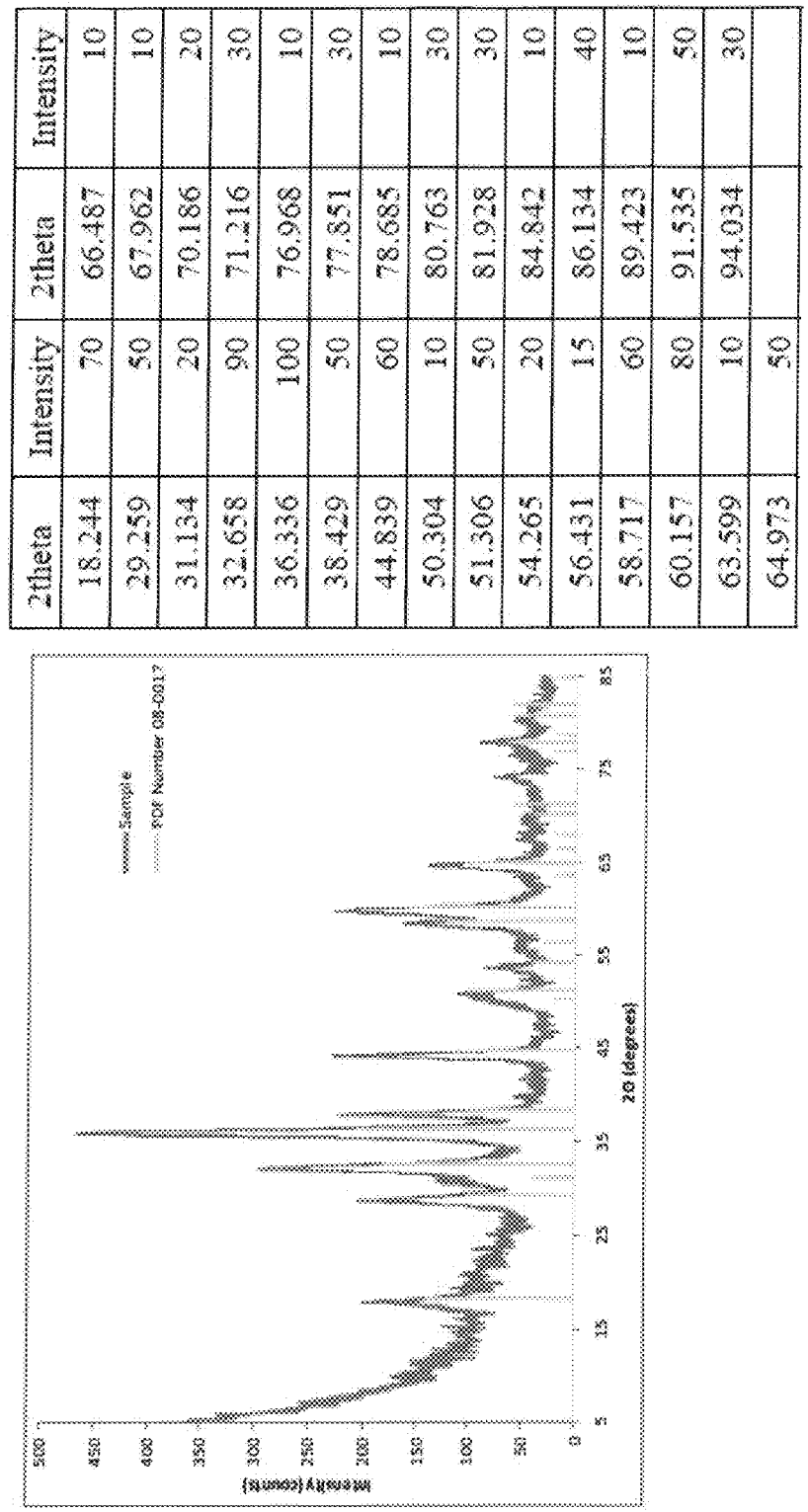
FIG. 10b is an X-ray diffraction (XRD) pattern of $Mn_3O_4$ nanocrystals compared with the known pattern for $Mn_3O_4$ (left); the peak positions and relative peak intensities are shown in the table (right).
Figure 11A:
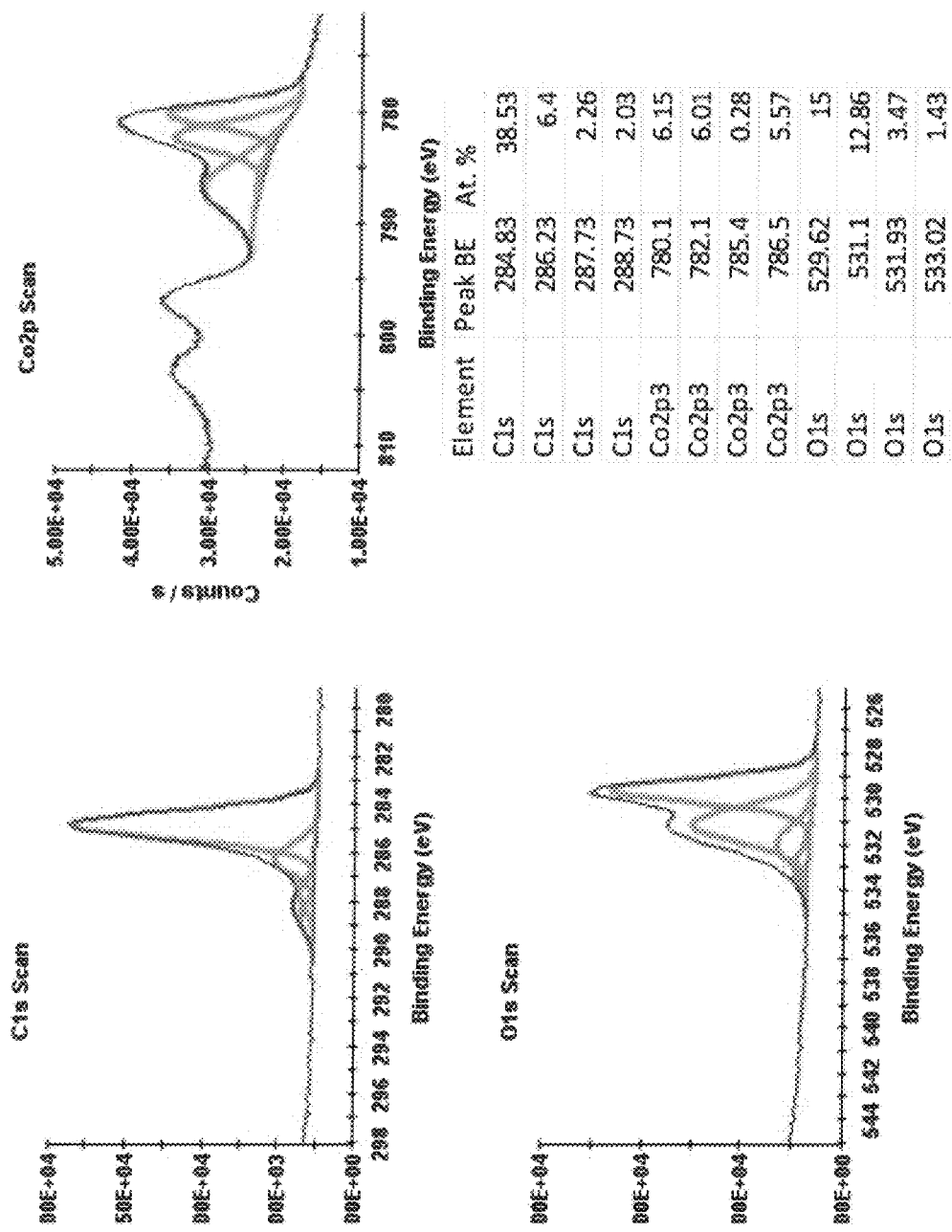
FIG. 11a shows X-ray photoelectron (XPS) spectra and binding energy (C 1s, O 1s, and Co 2p) of CoO nanocrystals.
Figure 11B:
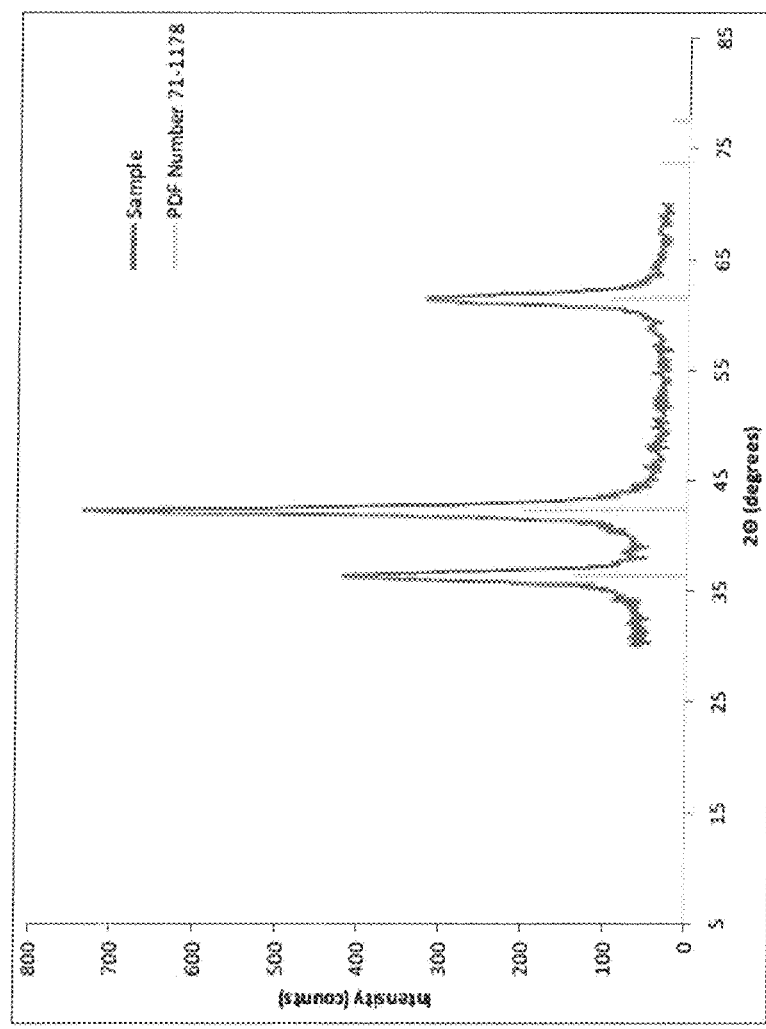
FIG. 11b is an X-ray diffraction (XRD) pattern of CoO nanocrystals compared with the known pattern for CoO (left); the peak positions and relative peak intensities are shown in the table (right).
Figure 12A:
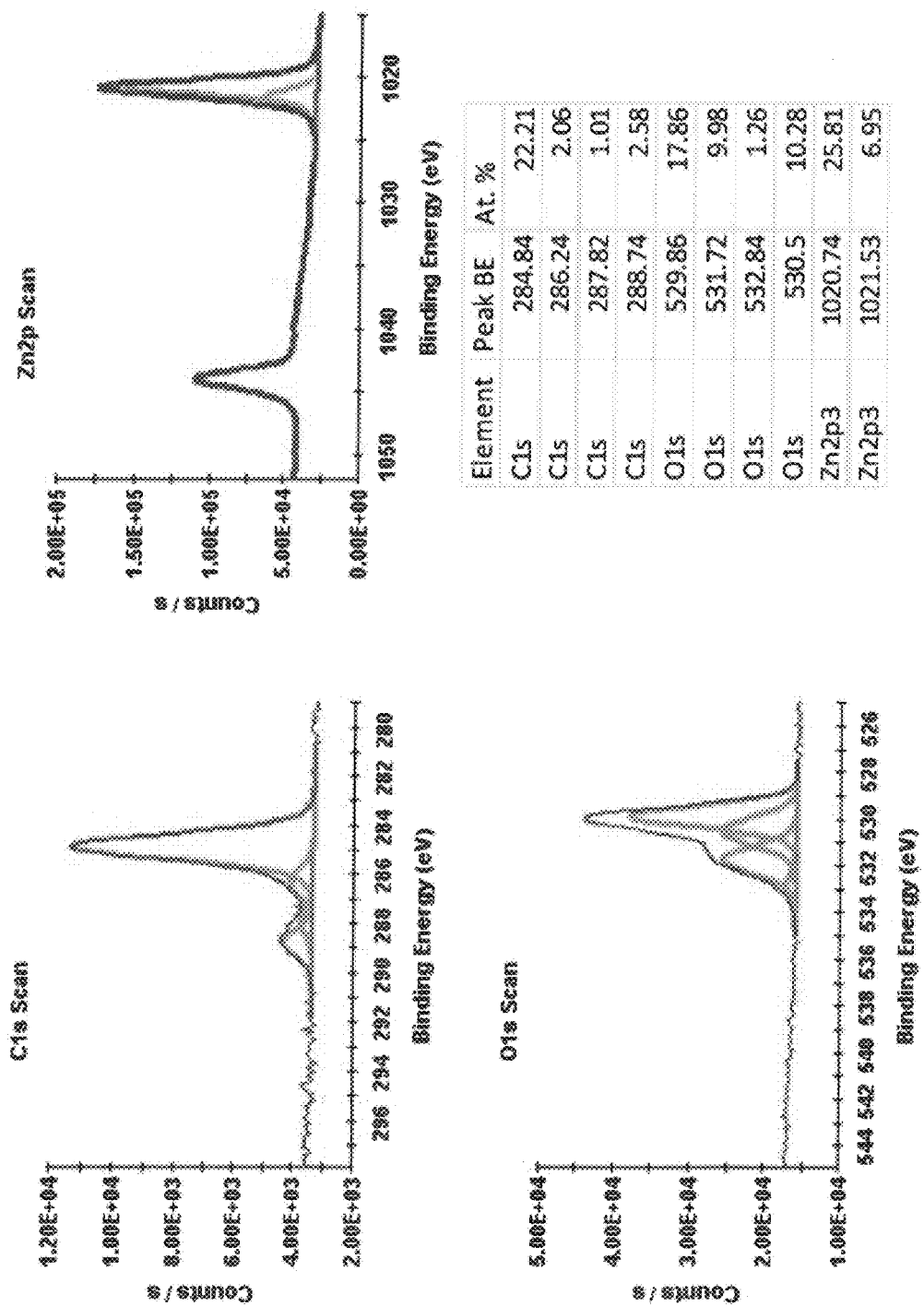
FIG. 12a shows X-ray photoelectron (XPS) spectra and binding energy (C 1s, O 1s, and Zn 2p) of ZnO nanocrystals.
Figure 12B:
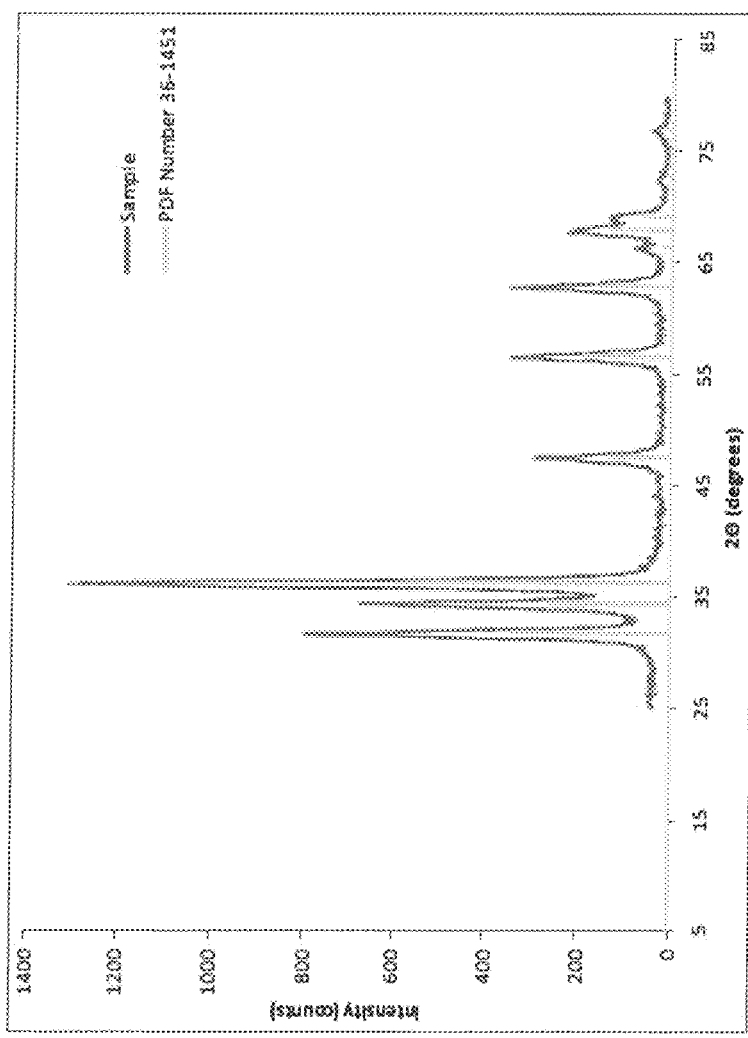
FIG. 12b is an X-ray diffraction (XRD) pattern of ZnO nanocrystals compared with the known pattern for ZnO (left); the peak positions and relative peak intensities are shown in the table (right).

The surface chemistries of each of these nanocrystals were investigated by XPS, XRD, and ToF-SIMS (FIGS. 9a-9b ($Fe_2O_3$), FIGS. 10a-10b ($Mn_3O_4$), FIGS. 11a-11b (CoO), FIGS. 12a-12b (ZnO)). In the XPS spectra, the spectra for the metal ions were consistent with the oxide forms identified by XRD. The O 1s spectra displayed peaks for the metal oxide and in all cases a smaller component at higher binding energy (531.1-537.7 eV depending upon the metal) consistent with a metal hydroxide species. Combined, the XRD results and the relatively smaller O 1s peak due to hydroxide suggested that there were hydroxy groups on the surface of the nanocrystals. As in the case of the $In_2O_3$ nanocrystals, the main surface ligand detected by ToF-SIMS was oleic acid (Table 1). In each case, small amounts of oleyl alcohol (7-11%) were present in the ligand shells for these nanocrystals.

TABLE 1

| | Normalized Intensity Oleyl Alcohol (M-3) | Normalized Intensity Oleic Acid (M-1) |
|---|---|---|
| m/z | 265.25 (found 265.28) | 281.26 (found 281.25) |
| $In_2O_3$ as synthesized | 16 | 1310 |
| $In_2O_3$ with oleyl alcohol added | 278 | 3665 |
| $\gamma$-$Fe_2O_3$ | 40 | 328 |
| CoO | 8 | 99 |
| $Mn_3O_4$ | 9 | 121 |
| ZnO | 8 | 88 |

Example 4

Tin-Doped $In_2O_3$ Nanoparticle Synthesis and Characterization

Figure 13:
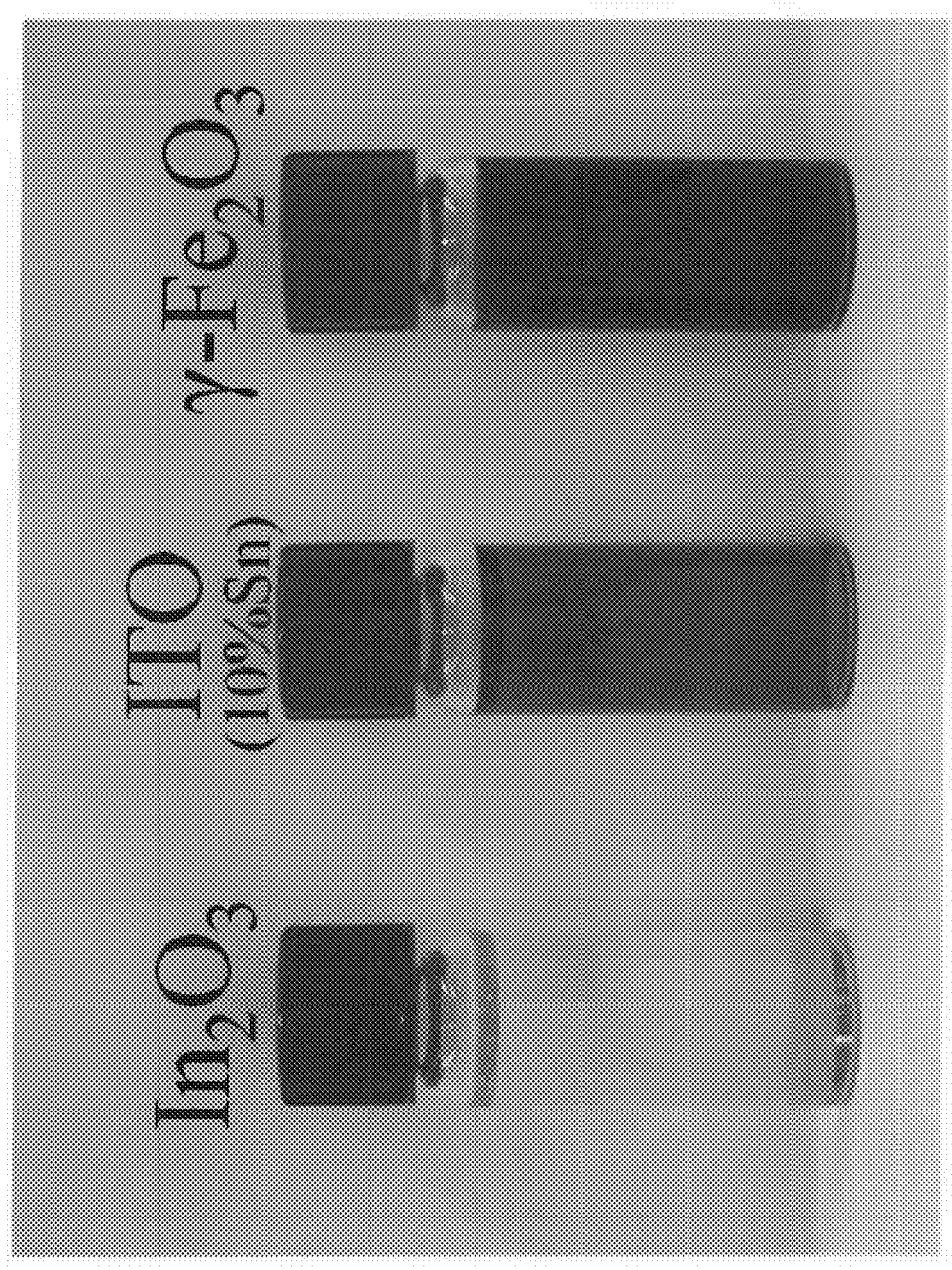
FIG. 13 is a color photograph of $In_2O_3$, indium tin oxide (10% tin), and $\gamma$-$Fe_2O_3$ nanocrystal solutions synthesized at 230° C. according to one embodiment of the disclosed methods.

Tin-doped $In_2O_3$ (ITO) nanocrystals were synthesized as described above under "General preparation of metal oxide nanocrystals." ITO nanocrystal solutions are deep blue, which is clearly different from the yellowish color of the non-doped nanocrystal $In_2O_3$ nanocrystal solution as shown in FIG. 13.

Figure 14:
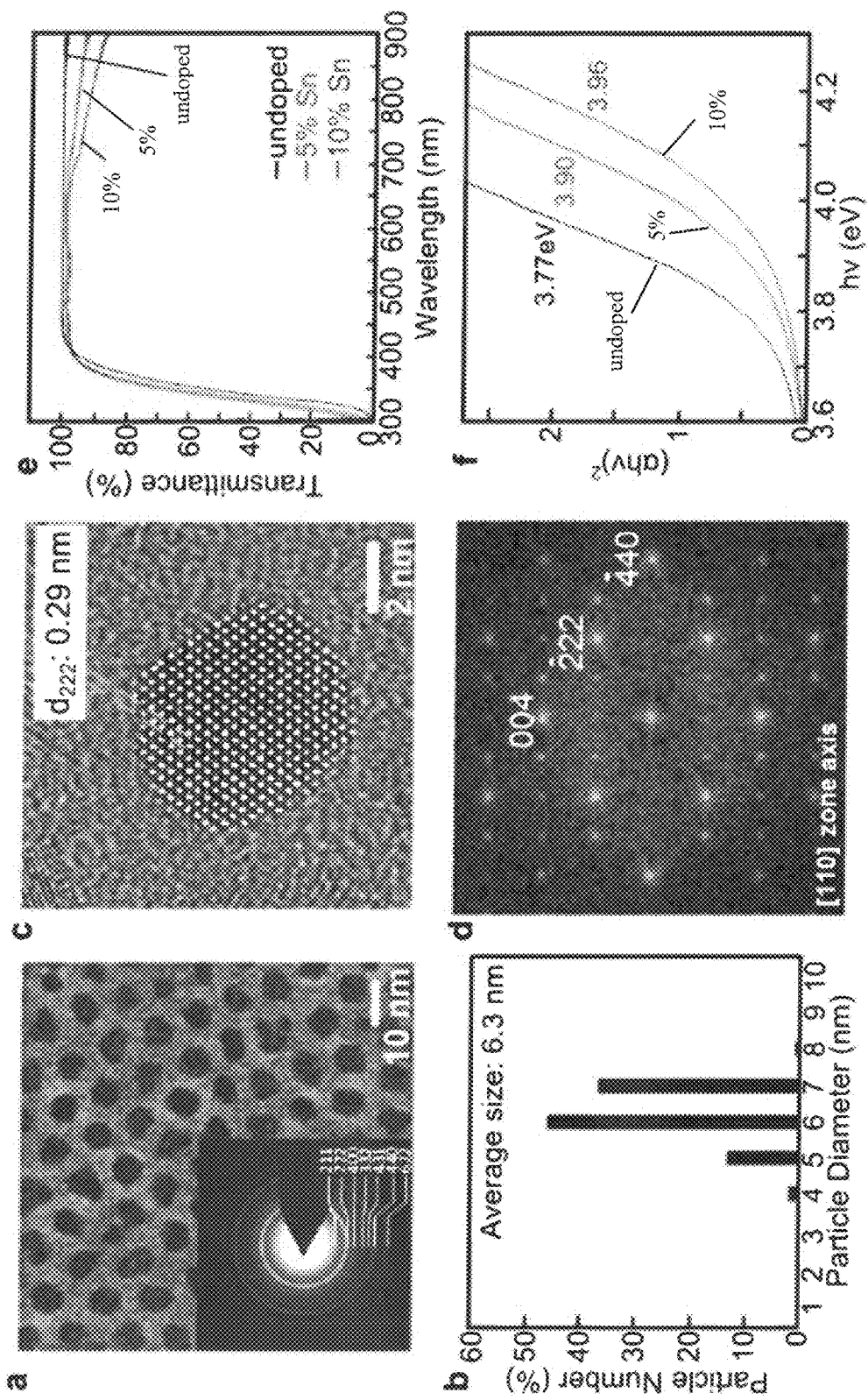

FIG. 14a and the inset show a TEM image of 10% tin-doped ITO nanocrystals and a selected area electron diffraction (SAED) pattern, respectively. These data showed that the ITO nanocrystals were monodisperse, and the matrix phase of the nanocrystals was cubic $In_2O_3$ without any other phases. The nanocrystals' average diameter was 6.3 nm±0.6 nm (FIG. 14b), which was slightly smaller than undoped $In_2O_3$ nanocrystals.

FIGS. 14c and 14d show a high-resolution TEM image of a typical tin-doped $In_2O_3$ nanocrystal and its FFT, respectively. The ITO nanocrystal was a truncated octahedron surrounded by {001} and {111} facets. {111} planes of $In_2O_3$ are also partially polar planes, so that it is possible to be passivated by oleic acid. The truncated octahedron is an intermediate between a {001}-faceted cube and a {111}-faceted octahedron. The lattice expansion of ITO nanocrystals (FIG. 14c) was 0.5% compared with the lattice constant of $In_2O_3$ nanocrystals (FIG. 5a). Since the value was higher than that of conventional ITO thin films (0 to 0.2%; Zhang et al., *J Phys. Chem.* 113, 5322-5327 (2008)), the lattice distortion could be high enough to change the shape from a cube to a truncated octahedron.

FIG. 14e shows the dependence of the UV-vis transmission spectra upon tin concentration for the ITO nanocrystal solutions. All of the solutions had >98% transmittance in the visible range, and showed reflections in the infrared range that are explained by free-electron vibrations (Gilstrap et al., *Thin Solid Films* 518, 1136-1139 (2009)). The blue shift of the bandgap resulting from increasing tin concentration can be explained by the Burstein-Moss effect (Zhang et al., *J. Phys. Chem.* 113, 5322-5327 (2008)).

In FIG. 14f, the UV-vis transmittance spectra are re-plotted as absorption versus energy so that the optical band edges could be estimated, and the Burstein-Moss shifts could be determined. Compared to non-doped $In_2O_3$ nanocrystals, Burstein-Moss shifts of 0.13 eV (5% Sn) and 0.19 eV (10% Sn) were observed, corresponding to $2.2 \times 10^{19}$ $cm^{-3}$ and $3.9 \times 10^{19}$ $cm^{-3}$ of free-electron concentrations. The free-electron concentration nearly doubled with the doubling of the tin concentration. Although the nanocrystal size (d~6 nm) was in the range of quantum confinement (Ito et al., *Appl. Physics Letters* 90, 143118 (2007), or full depletion of carrier electrons (Rothschild et al. *J. Applied Physics* 95, 6374 (2004)), the ITO nanocrystals showed significantly high values of free-electron concentrations suggesting a transparent metallic nanomaterial.

A comparison of undoped indium oxide nanocrystals, 5% tin-doped ITO nanocrystals, and 10% tin-doped ITO nanocrystals is shown in Table 2. Percent compositions of indium and tin in ITO nanocrystals were determined by XPS peaks of $In_{3d}$ and $Sn_{3d}$. The composition gap between initial precursors and nanocrystals was accurate to within ±0.5 at % by several repeated measurements. These results suggest that rapid esterification leads to simultaneous and complete precursor decomposition. The yield of nanocrystals at 230° C. was greater than 90%, as measured by mass in a gram-scale synthesis.

TABLE 2

| | In [%] | Sn [%] | Yield [%] | Burstein-Moss Shift[a] [eV] | Estimated free-electron concentration[a] [$cm^{-3}$] |
|---|---|---|---|---|---|
| $In_2O_3$ | 100 | 0.0 | 92 | 0.0 | 0.0 |
| 5% ITO | 95.3 | 4.7 | 92 | 0.13 | $2.2 \times 10^{19}$ |
| 10% ITO | 89.5 | 10.5 | 94 | 0.19 | $3.9 \times 10^{19}$ |

[a]Normalized to $In_2O_3$ nanocrystals.

Example 5

Epitaxial Core/Shell Nanocrystals: $\gamma$-$Fe_2O_3$—MnO and ZnO—$Ga_2O_3$ $\gamma$-$Fe_2O_3$/MnO and ZnO/$Ga_2O_3$ core/shell nanocrystals were prepared. $\gamma$-$Fe_2O_3$ and ZnO cores were prepared as described in Example 3. The purified cores were then dissolved in oleyl alcohol and heated to 160° C. under flowing nitrogen. Next, the metal oleates needed to form the shell were injected into the solution along with excess oleic acid and the reaction was maintained at this temperature for 1 hour. To prevent nucleation of new nanoparticles from the shell precursor, the temperature of solution was kept lower than nucleation temperatures for that metal oxide and oxygen was excluded.

Figure 15:
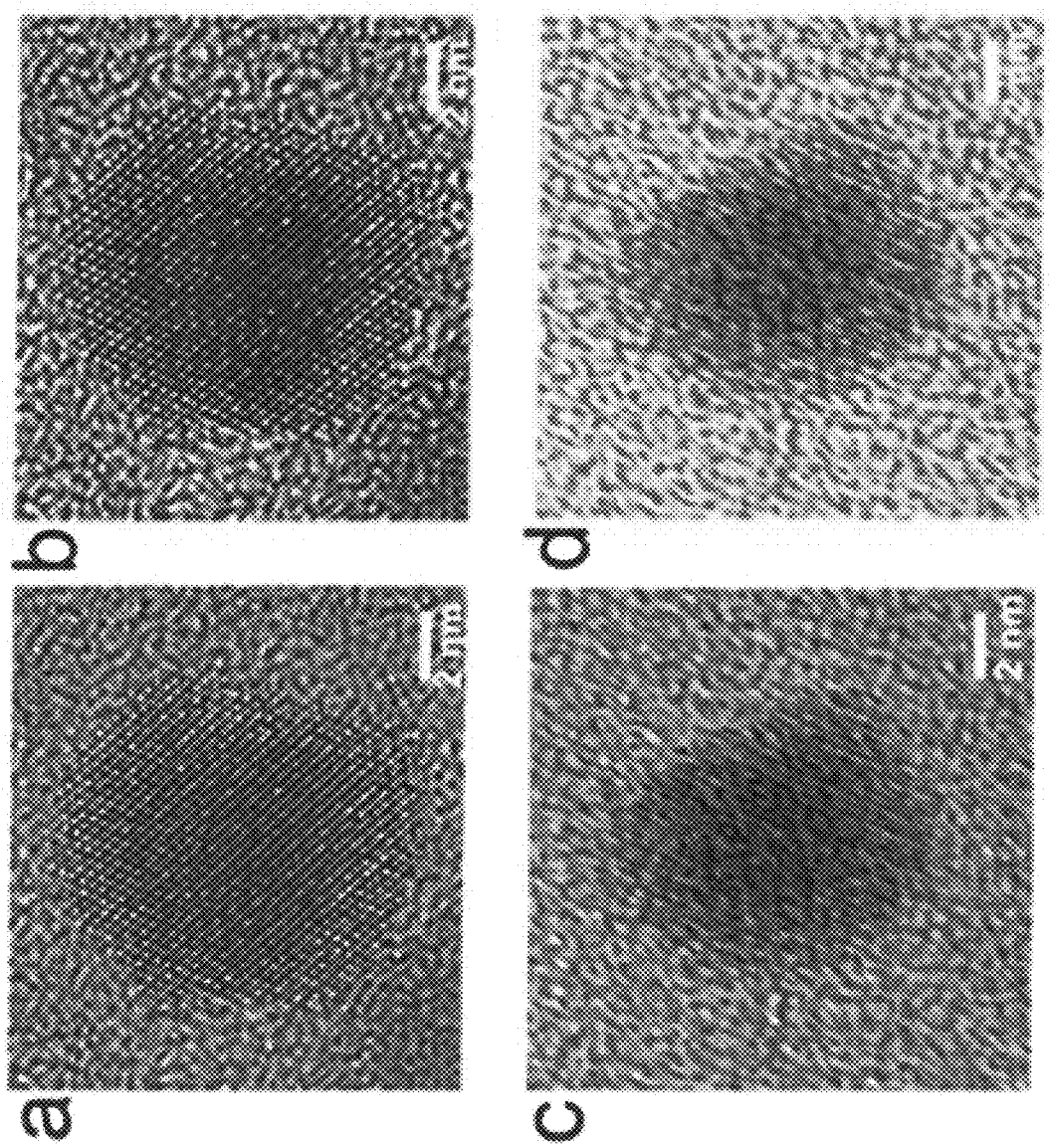
FIG. 15a is a high-resolution TEM image of a $\gamma$-$Fe_2O_3$/MnO core/shell nanocrystal.
FIG. 15b is a FFT-filtered image of a $\gamma$-$Fe_2O_3$/MnO core/shell nanocrystal.
FIG. 15c is a high-resolution TEM image of a ZnO/$Ga_2O_3$ core/shell nanocrystal.
FIG. 15d is a FFT-filtered image of a ZnO/$Ga_2O_3$ core/shell nanocrystal.

FIGS. 15a and 15b are, respectively a high-resolution TEM image and a FFT-filtered image of a $\gamma$-$Fe_2O_3$/MnO core/shell nanocrystal. A 2-nm thick MnO shell was grown epitaxially onto the $\gamma$-$Fe_2O_3$ core. The size of the core was approximately 4.5 nm, corresponding to the diameter of the $\gamma$-$Fe_2O_3$ nanocrystals used as seeds in this synthesis. The high resolution TEM image shows a d-spacing of 0.30 nm, indicating {110} planes of MnO which have an epitaxial relationship with the {220} planes of $\gamma$-$Fe_2O_3$ (the lattice mismatch between the structures is 5.6%).

FIGS. 15c and 15d are, respectively a high-resolution TEM image and a FFT-filtered image of a ZnO/$\beta$-$Ga_2O_3$ core/shell nanocrystal. A 2-nm thick crystalline $Ga_2O_3$ shell was grown onto a ZnO core. Adjacent lattice fringes with a d-spacing of 0.28 nm were obtained, which correspond to the (002) lattice planes of $\beta$-$Ga_2O_3$. Because the lattice mismatch between the (10-10) planes of ZnO (FIG. 3(d)) and (002) lattice planes of $Ga_2O_3$ is very small (0.1%), the $Ga_2O_3$ shell layer was grown epitaxially on ZnO nanocrystal.

Figure 16:
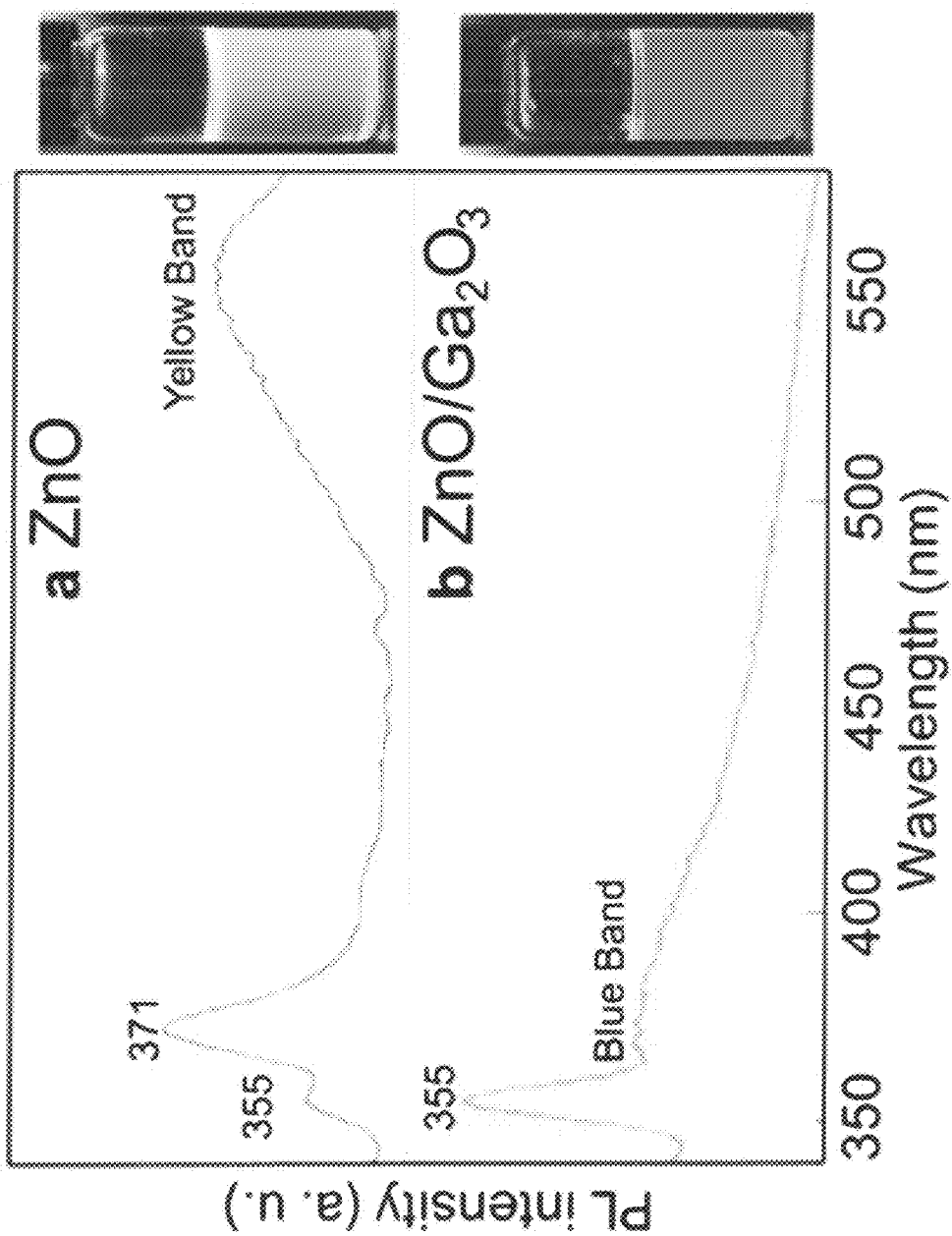
FIGS. 16a and 16b are, respectively photoluminescence spectra of ZnO nanocrystals and ZnO—$Ga_2O_3$ core-shell nanocrystals excited at 320 nm by a filtered Hg UV source.

FIGS. 16a and 16b are photoluminescence spectra of n-hexane solutions of ZnO nanocrystals and ZnO/$\beta$-$Ga_2O_3$ core-shell nanocrystals, respectively, excited at 320 nm by a filtered Hg UV source. In FIG. 16a, the emission peaks at 355 nm (3.49 eV), 371 nm (3.34 eV) and a yellow emission band centered at 560 nm (2.21 eV) are assigned to free exciton recombination, bound exciton recombination with ionized defects, and ionized oxygen vacancies in ZnO, respectively. The ZnO/β-Ga$_2$O$_3$ core-shell nanocrystals showed a very different emission spectrum. The dominant emission peak was at 355 nm (compared with 371 nm in ZnO), and the yellow emission band disappeared upon addition of the shell. These results suggest that surface oxygen defects present in ZnO were passivated by the addition of the Ga$_2$O$_3$. The bright blue emission band centered at 370 nm (3.35 eV) in the spectrum of the core-shell structure is the effect of oxygen vacancies in Ga$_2$O$_3$ shell, according to literature reports (Binet et al., *J. Phys. Chem. Solids* 59, 1241-1249 (1998); Chang, et al. *J. Phys. Chem. B* 109, 13572-13577 (2005)).

In view of the many possible embodiments to which the principles of the disclosed technology may be applied, it should be recognized that the illustrated embodiments are only preferred and should not be taken as limiting in scope. Rather, the scope is defined by the following claims. We therefore claim as our invention all that comes within the scope and spirit of these claims.

We claim:

1. A method for making nanoparticles comprising a metal oxide, the method comprising:
    providing a solution comprising RCOOH and a corresponding metal carboxylate comprising RCOO$^-$ and a metal cation M, wherein M is a group IIIA metal, a group IVA metal, a transition metal, or a combination thereof, and R is saturated or unsaturated C1-C21 aliphatic;
    injecting the solution at a rate of up to 0.5 mL/min into a solvent comprising R'OH to produce a mixture, wherein R' is saturated or unsaturated C2-C22 aliphatic, and wherein the solvent is preheated to a temperature T$_1$ of 100-290° C. prior to injecting the solution into the solvent; and
    maintaining the mixture at a temperature T$_2$ for an effective period of time to form crystalline metal oxide nanoparticles, wherein T$_2$ is less than the thermal decomposition temperature of the corresponding metal carboxylate.

2. The method of claim 1 where [R'OH]>[RCOOH]>[M] when the solution is injected into the solvent.

3. The method of claim 1 where [R'OH] is at least 10× greater than [M] when the solution is injected into the solvent.

4. The method of claim 1 where providing the solution comprising RCOOH and the metal carboxylate further comprises:
    providing a C1-C5 metal carboxylate comprising M;
    combining the C1-C5 metal carboxylate with a molar excess of RCOOH; and
    heating to convert at least a portion of the C1-C5 metal carboxylate to the metal carboxylate, thereby forming the solution comprising RCOOH and the metal carboxylate.

5. The method of claim 1 where M is Mn, Fe, Co, Zn, Sn, In, or a combination thereof.

6. The method of claim 1 where R' is RCH$_2$—.

7. The method of claim 1 where RCOOH is oleic acid and R'OH is oleyl alcohol.

8. The method of claim 1 where the solution is injected into the solvent at a rate of 0.1-0.5 mL/minute.

9. The method of claim 1 where T$_1$ and/or T$_2$ is 200° C. to 230° C. and/or the effective period of time is ≤30 minutes.

10. The method of claim 1, further comprising flowing a gas across a surface of the mixture, thereby evaporating and removing water produced as the crystalline metal oxide nanoparticles are formed.

11. The method of claim 1 where R and R' are linear aliphatic and differ in length by five or fewer carbon atoms.

12. The method of claim 1 where R'OH is a liquid at temperatures less than 200° C.

13. The method of claim 1 where the metal carboxylate comprising RCOO$^-$ and the metal cation M is soluble in R'OH at the temperature T$_2$.

14. The method of claim 1 where the crystalline metal oxide nanoparticles have a relative size dispersity of ≤20%.

15. The method of claim 1 where T$_2$ is 100-290° C.

16. A method for making core-shell nanoparticles, the method comprising:
    providing a solution comprising RCOOH and a corresponding metal carboxylate comprising RCOO$^-$ and a metal cation M, wherein M is a group IIIA metal, a group IVA metal, a transition metal, or a combination thereof, and R is saturated or unsaturated C1-C21 aliphatic;
    combining the solution with a solvent comprising R'OH to produce a mixture, wherein R' is saturated or unsaturated C2-C22 aliphatic, and wherein the solvent is preheated to a temperature T$_1$ of 100-290° C. prior to combining the solution with the solvent;
    maintaining the mixture at a temperature T$_2$ for an effective period of time to form crystalline metal oxide nanoparticles, wherein T$_2$ is less than the thermal decomposition temperature of the corresponding metal carboxylate; and
    depositing a metal oxide shell onto the crystalline metal oxide nanoparticles by
        combining the crystalline metal oxide nanoparticles with R'''OH to produce a mixture, where R''' is saturated or unsaturated C2-C22 aliphatic,
        heating the mixture to a temperature T$_3$ of ≤200° C.,
        providing a solution comprising R''COOH and a corresponding metal carboxylate comprising R''COO$^-$ and a metal cation M', where M' is a group IIIA metal, a group IVA metal, a transition metal, or a combination thereof, M' and M are different metals, and R'' is saturated or unsaturated C1-C21 aliphatic;
        combining the solution with the mixture, and
        maintaining the combined solution and mixture at a temperature T$_4$ of ≤200° C. for an effective period of time to form core-shell nanoparticles comprising a crystalline metal oxide core including M and a metal oxide shell including M' deposited onto the metal oxide core.

17. The method of claim 16 where R'' is R, and R''' and R' are RCH$_2$—.

18. The method of claim 16, where T$_4$ is less than a nucleation temperature for a metal oxide comprising M' and oxygen is excluded during deposition of the metal oxide shell.

19. The method of claim 16 where T$_3$ and/or T$_4$ is 150-200° C.

20. A method for making nanoparticles, comprising:
    providing a C1-C5 metal carboxylate comprising a metal cation M, wherein M is a group IIIA metal, a group IVA metal, a transition metal, or a combination thereof;
    combining the C1-C5 metal carboxylate with a molar excess of RCOOH, wherein R is saturated or unsaturated C5-C21 aliphatic;

heating to convert at least a portion of the C1-C5 metal carboxylate to a metal carboxylate comprising $RCOO^-$ and M, thereby forming a solution comprising RCOOH and the metal carboxylate comprising $RCOO^-$ and M;

preheating a solvent comprising R'OH to a temperature ranging from 100° C.-290° C. to form a preheated solvent, wherein R' is saturated or unsaturated C6-C22 aliphatic;

injecting the solution at a rate of up to 0.5 mL/min into the preheated solvent to produce a mixture, wherein [R'OH]>[RCOOH]>[M];

maintaining the mixture at a temperature ranging from 100° C.-290° C. under flowing nitrogen or air for an effective period of time to form crystalline nanoparticles comprising a metal oxide;

precipitating the crystalline nanoparticles; and isolating the crystalline nanoparticles.

21. The method of claim 20 where the C1-C5 metal carboxylate is a metal acetate, RCOOH is oleic acid, and R'OH is oleyl alcohol.

* * * * *

UNITED STATES PATENT AND TRADEMARK OFFICE
CERTIFICATE OF CORRECTION

PATENT NO. : 9,517,945 B2  
APPLICATION NO. : 14/092800  
DATED : December 13, 2016  
INVENTOR(S) : Daisuke Ito and James E. Hutchison It is certified that error appears in the above-identified patent and that said Letters Patent is hereby corrected as shown below:

In the Specification

Column 1, Lines 12-18, should be removed in their entirety.

"ACKNOWLEDGEMENT OF GOVERNMENT SUPPORT.
This invention was made with government support under FA8650-05-1-5041 awarded by the Air Force Research Laboratory. The government has certain rights in the invention."

Signed and Sealed this
Third Day of October, 2017

Joseph Matal
*Performing the Functions and Duties of the*
*Under Secretary of Commerce for Intellectual Property and*
*Director of the United States Patent and Trademark Office*